US009505163B2

(12) United States Patent
Thibodeau et al.

(10) Patent No.: US 9,505,163 B2
(45) Date of Patent: Nov. 29, 2016

(54) MANUFACTURING METHOD AND DEVICE FOR A CONTAINER WITH AN INTEGRAL HANDLE

(71) Applicant: DT Inventions, Houston, TX (US)

(72) Inventors: James Alfred Thibodeau, Gahanna, OH (US); Tim Thibodeau, Spring, TX (US)

(73) Assignee: DT Inventions, LLC, Houston, TX (US)

(*) Notice: Subject to any disclaimer, the term of this patent is extended or adjusted under 35 U.S.C. 154(b) by 194 days.

(21) Appl. No.: 14/160,350

(22) Filed: Jan. 21, 2014

(65) Prior Publication Data
US 2015/0202820 A1 Jul. 23, 2015

(51) Int. Cl.
B29C 49/48 (2006.01)
B29C 49/12 (2006.01)
B29C 49/42 (2006.01)
B29C 49/64 (2006.01)
B29B 11/14 (2006.01)
B29C 49/06 (2006.01)
B29C 49/68 (2006.01)
B29C 49/70 (2006.01)
B29C 49/20 (2006.01)

(52) U.S. Cl.
CPC ............ B29C 49/482 (2013.01); B29B 11/14 (2013.01); B29C 49/12 (2013.01); B29C 49/4205 (2013.01); B29C 49/4242 (2013.01); B29C 49/4802 (2013.01); B29C 49/6409 (2013.01); B29B 2911/14013 (2013.01); B29B 2911/14513 (2013.01); B29B 2911/14526 (2013.01); B29C 49/06 (2013.01); B29C 49/4247 (2013.01); B29C 49/6472 (2013.01); B29C 49/68 (2013.01); B29C 49/70 (2013.01); B29C 2049/1238 (2013.01); B29C 2049/2017 (2013.01); B29C 2049/2039 (2013.01); B29C 2049/4226 (2013.01); B29C 2049/4807 (2013.01)

(58) Field of Classification Search
None
See application file for complete search history.

(56) References Cited

U.S. PATENT DOCUMENTS

| 4,311,246 | A  | * | 1/1982 | Saito | ............... | B29C 49/0073 |
|           |    |   |        |       |                | 215/398 |
| 6,179,143 | B1 | * | 1/2001 | Grob  | ............... | B29B 11/04 |
|           |    |   |        |       |                | 215/398 |
| 6,855,289 | B2 | * | 2/2005 | Krishnakumar | ......... | B29C 49/20 |
|           |    |   |        |       |                | 264/516 |
| 8,524,143 | B2 |   | 9/2013 | Thibodeau | | |
| 2004/0108627 | A1 | | 6/2004 | Schumann | | |
| 2004/0185197 | A1 | | 9/2004 | Human | | |

FOREIGN PATENT DOCUMENTS

EP 0346518 A1 12/1989
WO 2013/093610 A1 6/2013

OTHER PUBLICATIONS

International Search Report issued in corresponding International Application No. PCT/US2015/011734, mailed on May 28, 2015 (5 pages).
Written Opinion issued in corresponding International Application No. PCT/US2015/011734, mailed on May 28, 2015 (4 pages).

* cited by examiner

Primary Examiner — Monica Huson
(74) Attorney, Agent, or Firm — Osha Liang LLP

(57) ABSTRACT

A method for forming a container with an integral handle includes heating a preform having an integral handle in a first oven, stretching the preform, closing a first mold having a first mold recess and a second mold having a second mold recess around the preform, and blowing air into the preform. A handle pocket wedge block is inserted into a handle pocket of the integral handle of the preform within the first mold and the second mold.

19 Claims, 32 Drawing Sheets

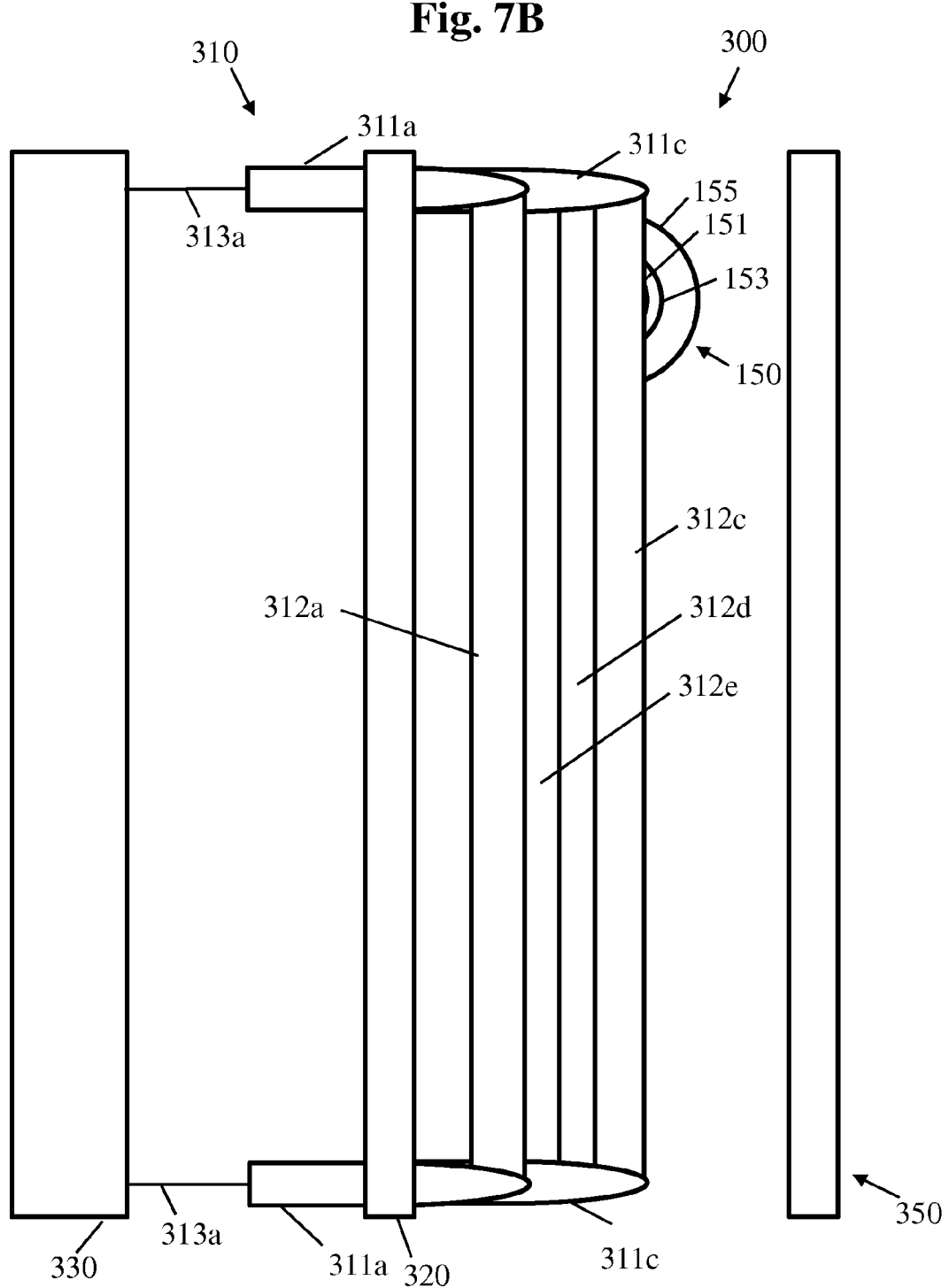

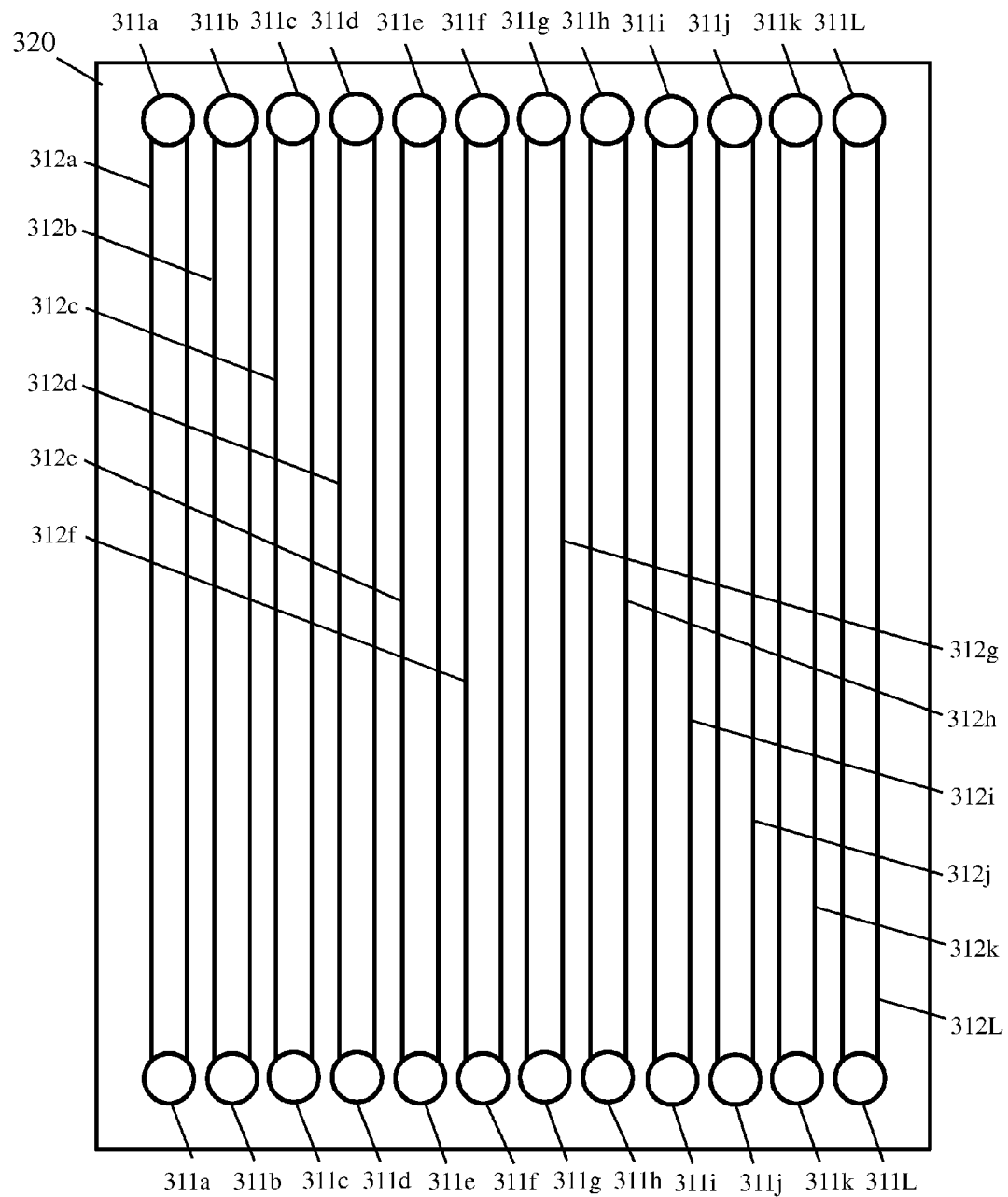

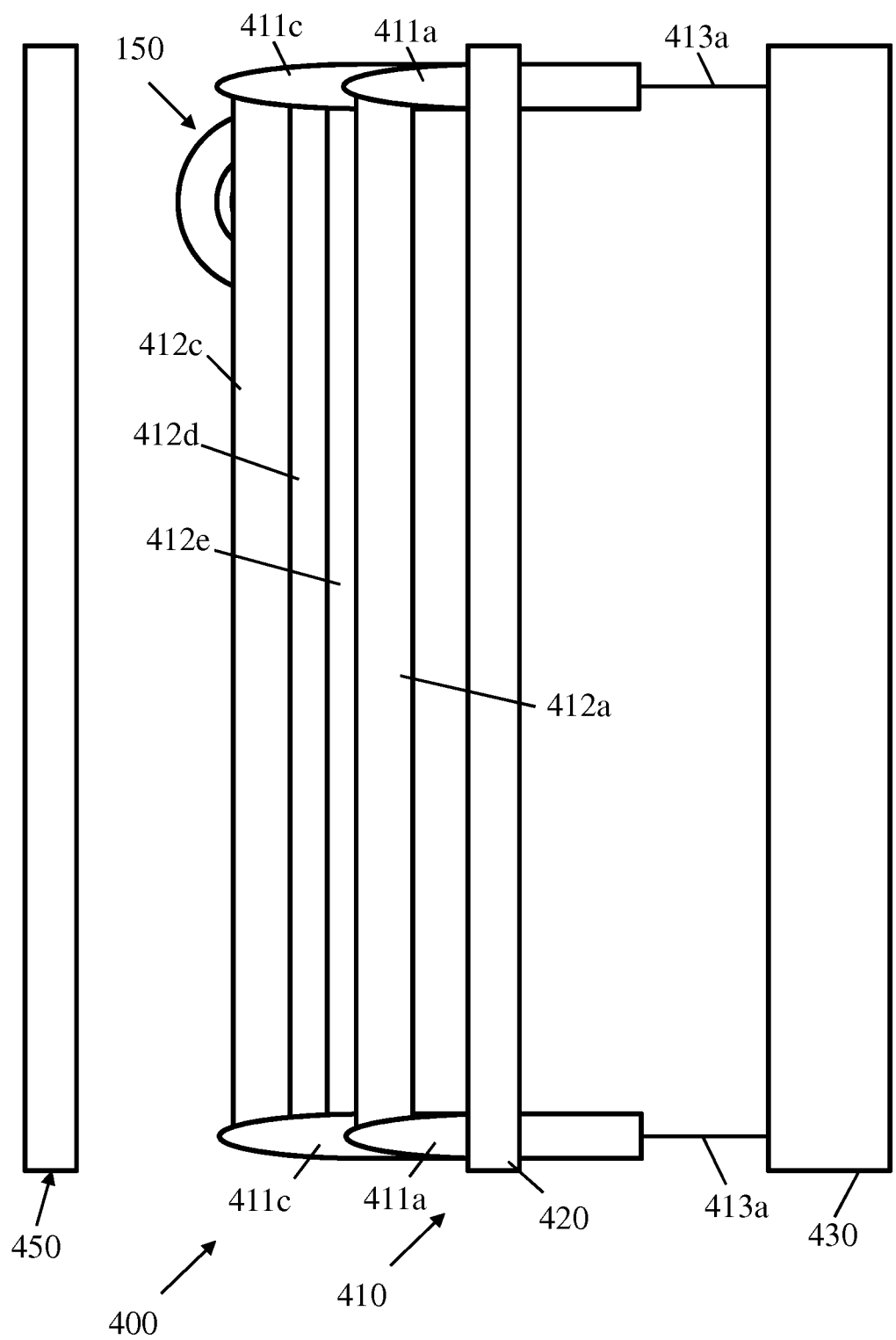

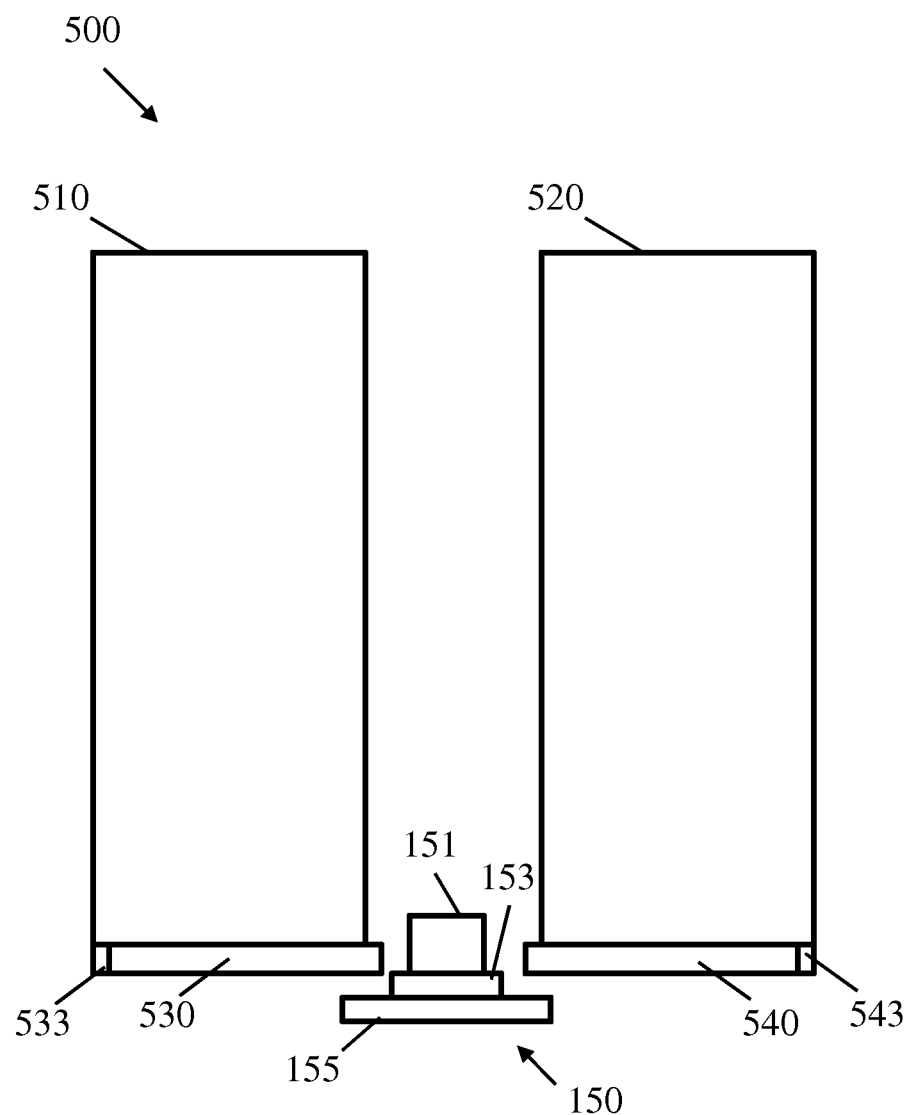

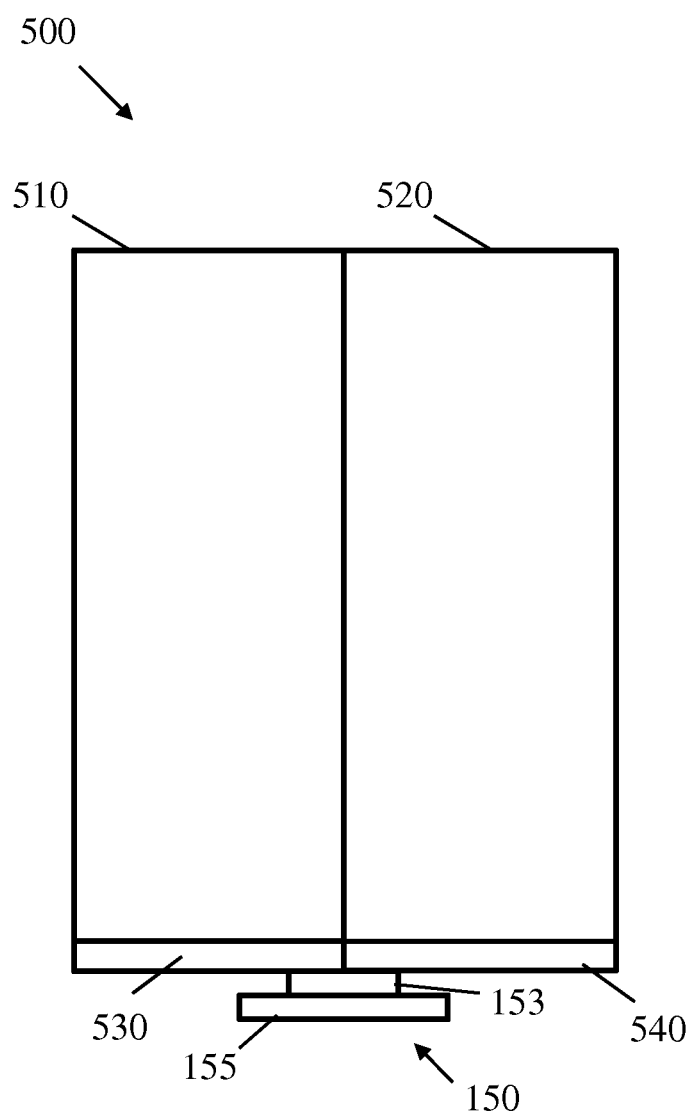

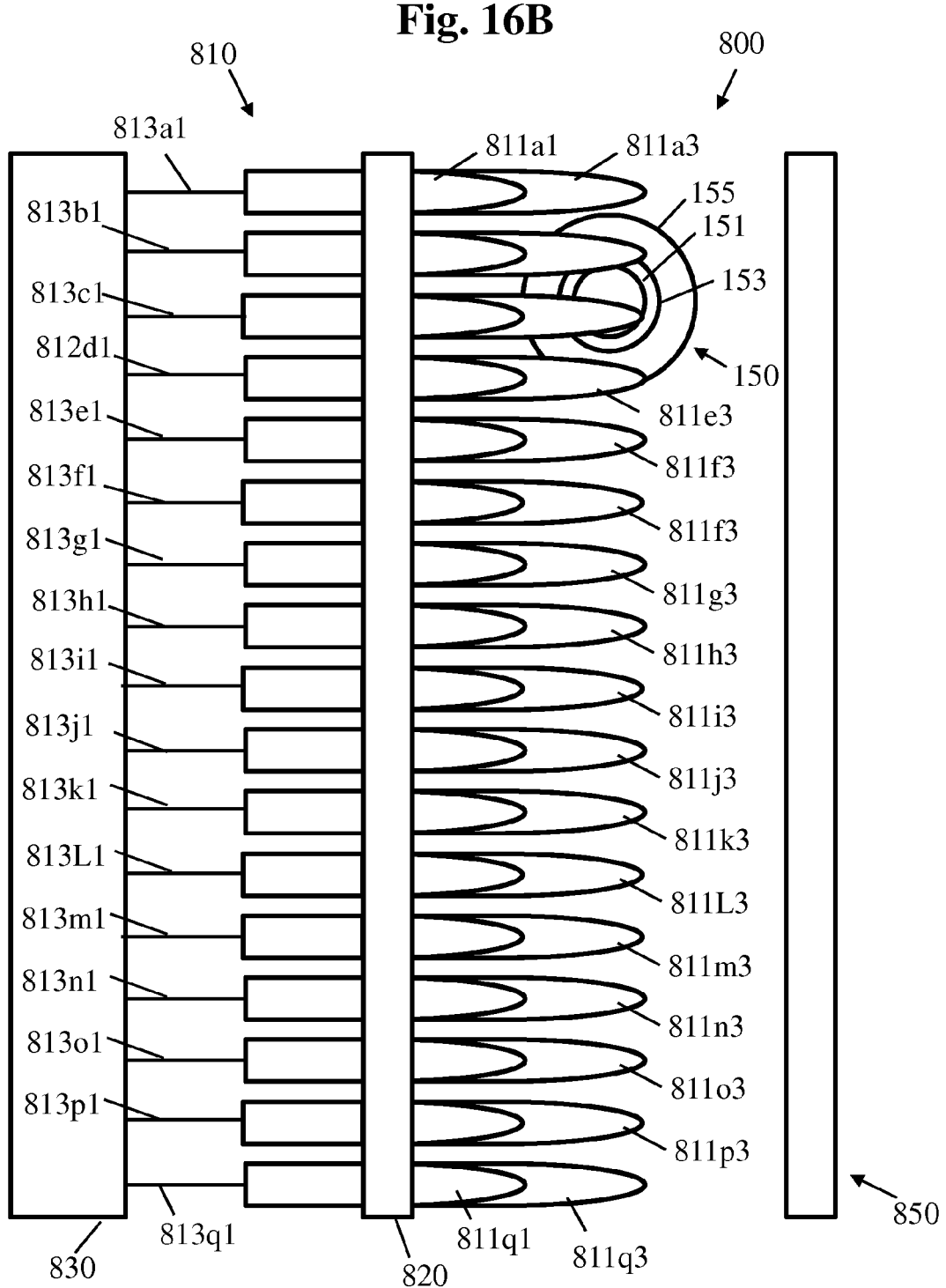

MANUFACTURING METHOD AND DEVICE FOR A CONTAINER WITH AN INTEGRAL HANDLE

BACKGROUND

Field of the Disclosure

The present invention relates to a method and device for forming a container. More specifically, the present invention relates to a method and device for forming a container with an integral handle from a preform.

Description of the Related Art

Conventionally, numerous types of containers, including plastic bottles for holding fluids, are formed by blow-molding. For some applications, handles are desired for carrying the container.

The handles are usually attached in a separate process step, after the main body of the container was formed by blow-molding. For example, after removal of the formed container main body from the blow mold, the formed container main body may then be transferred to another mold and the handle may be formed onto the container main body by injection molding. Alternatively, a separately formed handle may be snapped onto the neck of the formed container main body.

Other examples of methods for forming a container with a handle are set forth in the background section of U.S. Pat. No. 8,524,143. U.S. Pat. No. 8,524,143, which discloses a method for forming a container with an integral handle, is hereby incorporated by reference in its entirety.

SUMMARY

According to one or more embodiments of the present invention, a method for forming a container with an integral handle includes heating a preform having an integral handle in a first oven, stretching the preform, closing a first mold having a first mold recess and a second mold having a second mold recess around the preform, and blowing air into the preform. A handle pocket wedge block is inserted into a handle pocket of the integral handle of the preform within the first mold and the second mold.

According to one or more embodiments of the present invention, a method for forming a container with an integral handle includes uncoiling a U-shaped portion of the integral handle of the preform while stretching the preform.

According to one or more embodiments of the present invention, in a method for forming a container with an integral handle, the stretching the preform is performed with a stretch rod inserted into the preform.

According to one or more embodiments of the present invention, in a method for forming a container with an integral handle, the stretching the preform is performed with a multi-stage stretch rod inserted into the preform. The multi-stage stretch rod comprises a first stage stretch rod body that extends a first distance, and a second stage stretch rod body having a diameter smaller than the first stage stretch rod body that extends from an end of the first stretch rod body.

According to one or more embodiments of the present invention, in a method for forming a container with an integral handle, the handle pocket wedge block comprises a tapered cam surface that moves the integral handle as the handle pocket wedge block is inserted into the handle pocket of the integral handle.

According to one or more embodiments of the present invention, in a method for forming a container with an integral handle, the handle pocket wedge block comprises a first handle pocket wedge block disposed on the first mold, and a second handle pocket wedge block disposed on a second mold. The first handle pocket wedge block is inserted into an upper portion of the handle pocket of the integral handle in a first direction, and the second handle pocket wedge block is inserted into a lower portion of the handle pocket of the integral handle in a second direction opposite the first direction.

According to one or more embodiments of the present invention, in a method for forming a container with an integral handle, the first handle pocket wedge block comprises a first tapered cam surface that moves the integral handle as the first handle pocket wedge block is inserted into the upper portion of the handle pocket of the integral handle. The second handle pocket wedge block comprises a second tapered cam surface that moves the integral handle as the second handle pocket wedge block is inserted into the lower portion of the handle pocket of the integral handle.

According to one or more embodiments of the present invention, a method for forming a container with an integral handle includes cooling at least a portion of the integral handle by blowing air on the integral handle after the preform is heated in the first oven, and heating the preform in a second oven.

According to one or more embodiments of the present invention, a method for forming a container with an integral handle includes adjusting orientation of the preform before closing the first mold and the second mold around the preform.

According to one or more embodiments of the present invention, a method for forming a container with an integral handle includes catching a neck portion of the preform in a catch before stretching the preform.

According to one or more embodiments of the present invention, in a method for forming a container with an integral handle, the catch comprises a first turnstile and a second turnstile comprising a plurality of semicircular catching surfaces, and the neck portion of the preform is secured between opposing semi-circular catching surfaces of the first and second turnstiles.

According to one or more embodiments of the present invention, in a method for forming a container with an integral handle, the catch comprises a spring-loaded first catch body having a first catching surface, and a spring-loaded second catch body having a second catching surface, and the neck portion of the preform is secured between the first catching surface and the second catching surface.

According to one or more embodiments of the present invention, a method for forming a container with an integral handle includes loading the preform onto a mandrel disposed on a conveyor. One of the preform and the mandrel comprises a notch, and the other of the preform and the mandrel comprises a recess, and the notch engages with the recess to secure an orientation of the preform with respect to the mandrel.

According to one or more embodiments of the present invention, a method for forming a container with an integral handle includes catching a neck of the preform between a first mold catch disposed on the first mold and a second mold catch disposed on the second mold.

According to one or more embodiments of the present invention, a method for forming a container with an integral handle includes disposing an insulation mask on the integral handle of the preform.

According to one or more embodiments of the present invention, in a method for forming a container with an integral handle, the first oven comprises a first heating bank comprising a plurality of heating elements, and each of the plurality of heating elements are individually movable in a direction perpendicular to a direction in which the preform passes through the first oven.

According to one or more embodiments of the present invention, in a method for forming a container with an integral handle, the first oven comprises first heating bank comprising a plurality of heating elements, and a heat output of each of the plurality of heating elements are individually controlled by a first heating bank controller.

According to one or more embodiments of the present invention, in a method for forming a container with an integral handle, the second oven comprises a second heating bank comprising a plurality of heating elements, and each of the plurality of heating elements are individually movable in a direction perpendicular to a direction in which the preform passes through the second oven.

According to one or more embodiments of the present invention, in a method for forming a container with an integral handle, the second oven comprises second heating bank comprising a plurality of heating elements, and a heat output of each of the plurality of heating elements are individually controlled by a second heating bank controller.

According to one or more embodiments of the present invention, a method for forming a container a handle comprises heating a preform having a handle attachment notch in a first oven, stretching the preform to move the handle attachment notch away from a handle attachment point or another handle attachment notch, closing a first mold having a first mold recess and a second mold having a second mold recess around the preform, and blowing air into the preform.

BRIEF DESCRIPTION OF DRAWINGS

Features of the present disclosure will become more apparent from the following description in conjunction with the accompanying drawings.

FIG. 7B shows a top view, of a first oven according to one or more embodiments of the present invention.

FIG. 7C shows a side view from the right side of a first heating bank according to one or more embodiments of the present invention.

FIG. 8B shows a top view, of a second oven according to one or more embodiments of the present invention.

FIG. 12A shows a front view of a mold station with open first and second molds, and FIG. 12B shows a front view of a mold station with closed front and second molds, according to one or more embodiments of the present invention.

FIG. 16B shows a top view, of a first oven according to one or more embodiments of the present invention.

DETAILED DESCRIPTION

Embodiments of the invention will be described in detail below with reference to drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
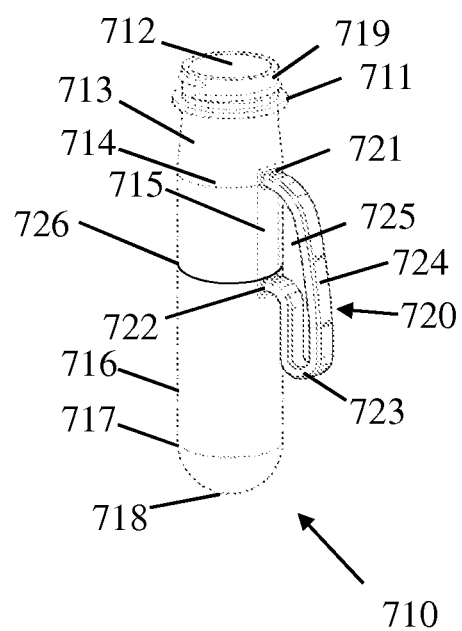
FIG. 1 is a perspective view of an example of a preform for use in a manufacturing method and device according to one or more embodiments of the present invention.

FIG. 1 is a perspective view of an example of a preform 710 for use in a manufacturing method and device according to one or more embodiments of the present invention. In FIG. 1, the preform 710 is oriented with an open mouth portion 712 at the top. According to one or more embodiments of the present invention, the preform 710 is formed from plastic. The preform 710 has a main body 716, a threaded neck portion 719, and a semi-spherical end portion 718 formed at the bottom of the preform 710, with an end transition 717 therebetween. The mouth portion 712 is formed in the neck portion 719. A thread stop 711 is formed below the neck portion 719, and a tapered portion 713 connects the main body 716 and the thread stop 711, with a taper transition 714 between the main body 716 and the tapered portion 713. According to one or more embodiments of the present invention, an inner circumference of the end transition 717 comprises a small ring-shaped notch for engagement with a stretch rod.

According to one or more embodiments of the present invention, the preform 710 is formed with an integral handle 720. The integral handle 720 is attached to the tapered portion 713 at a first attachment point 721, and to the main body 716 at a second attachment point 722. A second contact ring 726 is disposed on an inner circumference of the main body 716 at the second attachment point 722. According to one or more embodiments of the present invention, part of the first attachment point 721 is at the taper transition 714. Between the first attachment point 721 and the second attachment point 722 is an opposing surface 715 that is disposed on the main body 716 opposite the integral handle 720. The integral handle 720 extends outward from the first attachment point 721, and curves downwards to a straight handle portion 724. According to one or more embodiments of the present invention, the straight handle portion 724 may have a slight bend inwards near the center portion thereof. From the bottom of the straight handle portion 724, the integral handle 720 curves upwards and inwards at a U-shaped portion 723, then curves inwards to the second attachment point 722. A handle pocket 725 is formed within the integral handle 720, bounded by the integral handle 720 and the opposing surface 715.

Figure 2:
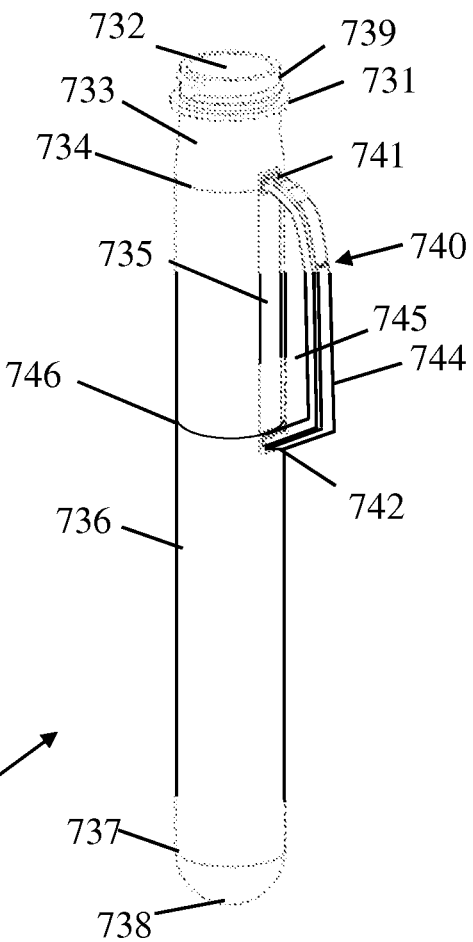
FIG. 2 is a perspective view of a stretched preform according to one or more embodiments of the present invention.

FIG. 2 is a perspective view of a stretched preform 730 according to one or more embodiments of the present invention. According to one or more embodiments of the present invention, the stretched preform 730 is formed by stretching the preform 710 of FIG. 1 with a stretch rod. In FIG. 2, the stretched preform 710 is oriented with an open mouth portion 732 at the top. According to one or more embodiments of the present invention, the stretched preform 730 is formed from plastic. The stretched preform 730 has a main body 736, a threaded neck portion 739, and a semi-spherical end portion 738 formed at the bottom of the stretched preform 730, with an end transition 737 therebetween. The mouth portion 732 is formed in the neck portion 739. A thread stop 731 is formed below the neck portion 739, and a tapered portion 733 connects the main body 736 and the thread stop 731, with a taper transition 734 between the main body 736 and the tapered portion 733. As shown in FIG. 2, the main body 736 of the stretched preform 730 has been stretched to be significantly longer than the main body 716 of the unstretched preform 710.

According to one or more embodiments of the present invention, the stretched preform 730 is formed with an integral handle 740. The integral handle 740 is attached to the tapered portion 733 at a first attachment point 741, and to the main body 736 at a second attachment point 742. A second contact ring 746 is disposed on an inner circumference of the main body 736 at the second attachment point 742. According to one or more embodiments of the present invention, part of the first attachment point 741 is at the taper transition 734. Between the first attachment point 741 and the second attachment point 742 is an opposing surface 735 that is disposed on the main body 736 opposite the integral handle 740. The integral handle 740 extends outward from the first attachment point 741, and curves downwards to a straight handle portion 744.

As shown in FIG. 2, the straight handle portion 744 of the stretched preform 730 is significantly longer than the straight handle portion 724 of the unstretched preform 710. According to one or more embodiments of the present invention, when the stretch rod stretches the preform 710, the second attachment portion 742 moves downwards, uncoiling the U-shaped portion 723, such that most of the U-shaped portion 723 becomes part of the straight handle portion 744. Additionally, because the second attachment point 742 moves downwards as the preform 710 is stretched by the stretch rod, the opposing surface 735 of the stretched preform 730 between the first attachment point 741 and the second attachment point 742 becomes longer than the opposing surface 715 of the unstretched preform 710. According to one or more embodiments of the present invention, the straight handle portion 744 may have a slight bend inwards near the center portion thereof. From the bottom of straight handle portion 744, the integral handle 740 curves inwards to the second attachment point 742. A handle pocket 745 is formed within the integral handle 740, bounded by the integral handle 740 and the opposing surface 735.

Figure 3:
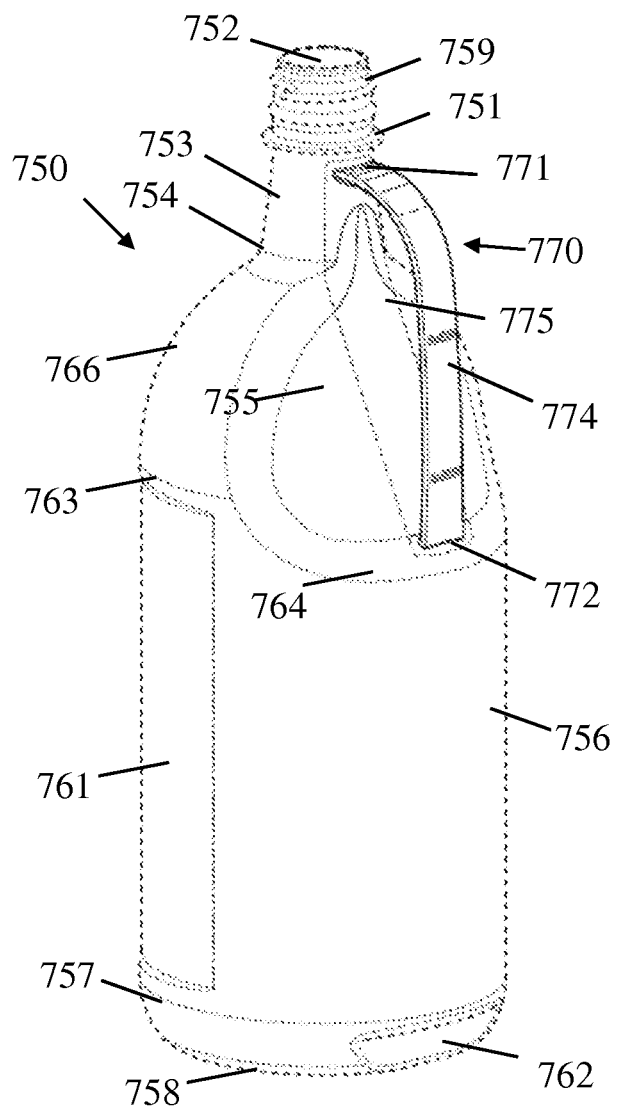
FIG. 3 is a perspective view of an example of a container with an integral handle formed by a manufacturing method and device according to one or more embodiments of the present invention.

FIG. 3 is a perspective view of an example of a container 750 with an integral handle 770 formed by a manufacturing method and device according to one or more embodiments of the present invention. According to one or more embodiments of the present invention, the container 750 is formed by blowing the stretched preform 730 of FIG. 2 within a mold. In FIG. 3, the container 750 is oriented with an open mouth portion 752 at the top. According to one or more embodiments of the present invention, the container 750 is formed from plastic. The container 750 has a main body 756, a threaded neck portion 759, and a bottom end portion 758 formed at the bottom of the container 750, with an end transition 757 therebetween. According to one or more embodiments of the present invention, the bottom of the bottom end portion 758 is formed to be substantially flat, so that the container 750 can stand upright. Alternatively, the bottom of the bottom end portion 758 may have a ring shaped flat surface, with a recessed portion formed therein to provide strength to the bottom end surface 758. The mouth portion 752 is formed in the neck portion 759. A thread stop 751 is formed below the neck portion 759, and a tapered portion 753 connects the main body 756 and the thread stop 751, with a taper transition 754 between the main body 756 and the tapered portion 753. Additionally, the main body 756 also has a curved portion 766 between a cylindrical portion of the main body 756 and the tapered portion 753. According to one or more embodiments of the present invention, a notch 762 is formed on one side of the bottom end portion 758.

According to one or more embodiments of the present invention, the container 750 is formed with an integral handle 770. The integral handle 770 is attached to the tapered portion 753 at a first attachment point 771, and to the main body 756 at a second attachment point 772. Between the first attachment point 771 and the second attachment point 772 is an opposing surface 755 that is disposed on the main body 756 opposite the integral handle 770. As shown in FIG. 3, due to the expansion that occurs during the blowing process, the opposing surface 755 of the container 750 is significantly larger than the opposing surface 735 of the stretched preform 730. According to one or more embodiments of the present invention, the opposing surface 755 is slightly curved inwards. An opposing surface transition 764 is formed between the main body 756 and the opposing surface 755. The integral handle 770 extends outward from the first attachment point 771, and curves downwards to a straight handle portion 774. As shown in FIG. 3, due to the expansion that occurs during the blowing process, the second attachment point 772 of the container 750 is disposed further out in the radial direction than the first attachment point 771 of the container 750. According to one or more embodiments of the present invention, the bottom of straight handle portion 774 is attached to the container 750 at the second attachment point 742. Alternatively, the integral handle 770 may curve inwards towards the main body 756 from the bottom of the straight handle portion 774, and attach to the main body 756 at the second attachment point 772. A handle pocket 775 is formed within the integral handle 770, bounded by the integral handle 770 and the opposing surface 755. According to one or more embodiments of the present invention, the container 750 may also include a recessed surface 761 for attaching a label to the container 750.

Figure 4:
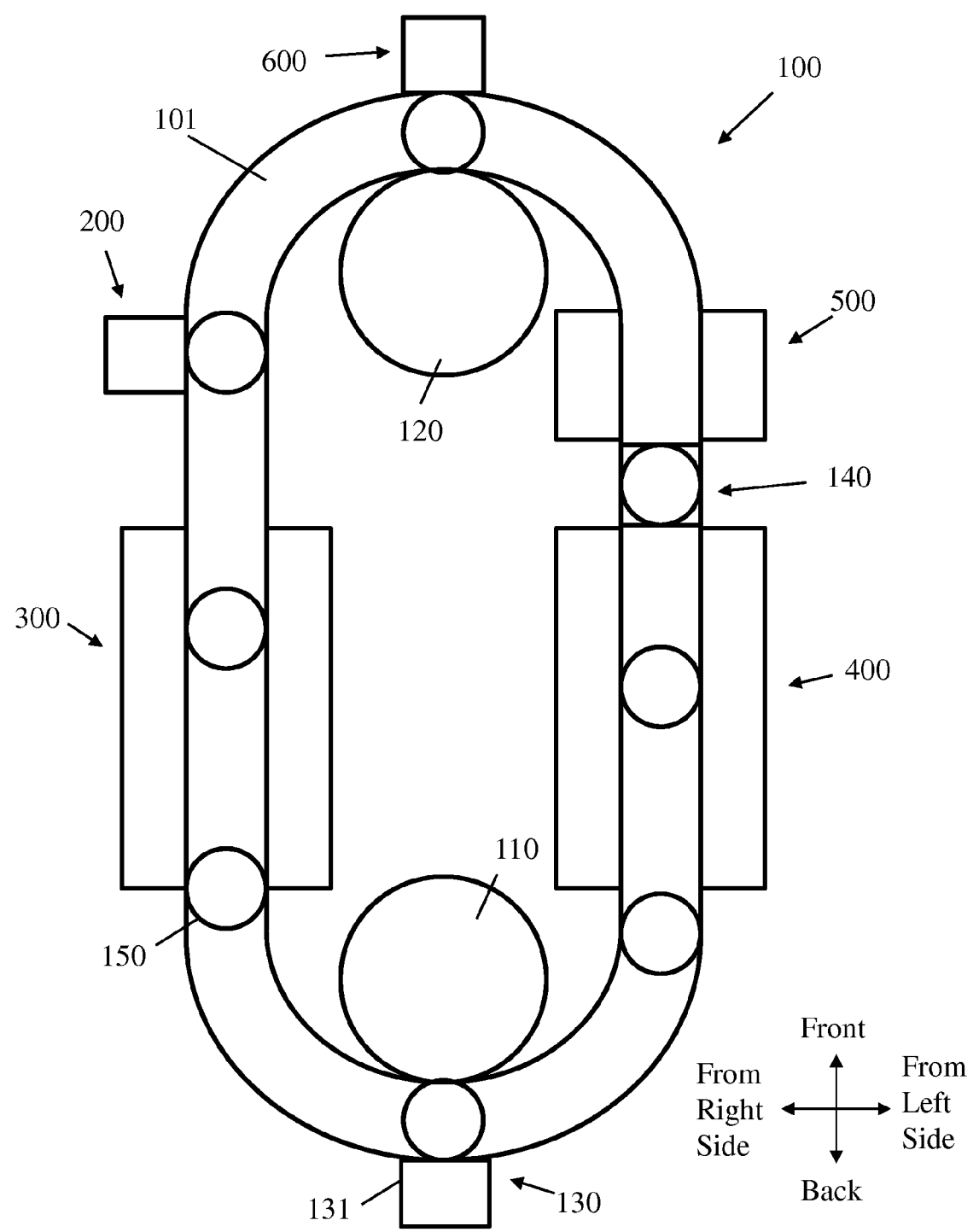
FIG. 4 is a schematic diagram showing a top view of a manufacturing line for forming a container with an integral handle from a preform, according to one or more embodiments of the present invention.

FIG. 4 is a schematic diagram showing a top view of manufacturing line 100 for forming a container 750 with an integral handle 770 from a preform 710, according to one or more embodiments of the present invention. The manufacturing line 100 includes a conveyor 101, a plurality of mandrels 150 disposed on the conveyor 101, and actuating wheels 110, 120 engaged with the conveyor 101 for actuating the conveyor 101. According to one or more embodiments of the present invention, the manufacturing line 100 also includes one or more of a loading station 200, a first oven 300, a calibration station 130, a second oven 400, an orientation station 140, a mold station 500, and an unloading station 600. The loading station 200, the first and second ovens 300, 400, the mold station 500, and the unloading station 600 are described below in further detail with reference to FIGS. 6A-15D.

According to one or more embodiments of the present invention, the conveyor 101 is actuated counter-clockwise by the actuating wheels 110, 120. According to one or more embodiments of the present invention, the mandrel 150 includes a notch or a recess that engages with a notch or a recess disposed on the preform 710, such that the preform 710 can be accurately and precisely oriented with respect to the mandrel 150.

According to one or more embodiments of the present invention, a notch is disposed on the preform 710, and an external mechanism locates the preform notch externally, such that the preform 710 can be accurately and precisely oriented with respect to the mandrel 150. According to one or more embodiments of the present invention, the external mechanism is a spring loaded detent.

According to one or more embodiments of the present invention, the calibration station 130 includes a fan 131 that selectively cools the preform disposed on the mandrel 150. For example, the fan 131 may cool the integral handle 720 to keep the integral handle 720 from crystallizing. According to one or more embodiments of the present invention, the calibration station 130 may also include other cooling components, such as an air conditioning device, an airflow diverting device that alters the direction of the airflow from the fan 131 and/or air conditioning device, temperature sensors for sensing the temperature of the air around the preform 710, the temperature of the air coming from the fan 131 and/or air conditioning unit, and the temperature of the preform 710 and/or the integral handle 730, and a controller operatively connected to the sensors for controlling the airflow rate of the fan 131 and/or the air conditioning device, temperature of the airflow from the air conditioning device, and the airflow diverting device.

According to one or more embodiments of the present invention, the orientation station 140 orients the preform 710 by accurately sensing the orientation of the preform 710 on the mandrel 150 before the mold station 500, and correcting the orientation by turning the mandrel 150 or a part of the mandrel, if necessary. According to one or more embodiments of the present invention, the orientation station 140 includes an orientation sensor for sensing the orientation of the preform 710. According to one or more embodiments of the present invention, the orientation sensor includes a camera that captures an image of the preform 710, and an orientation analysis device that analyzes the image of the preform 710 to discern the orientation thereof. According to one or more embodiments of the present invention, the orientation station 140 includes an orientation correction device for correcting the orientation of the preform 710 based on the orientation sensed by the orientation sensor.

Figure 5:
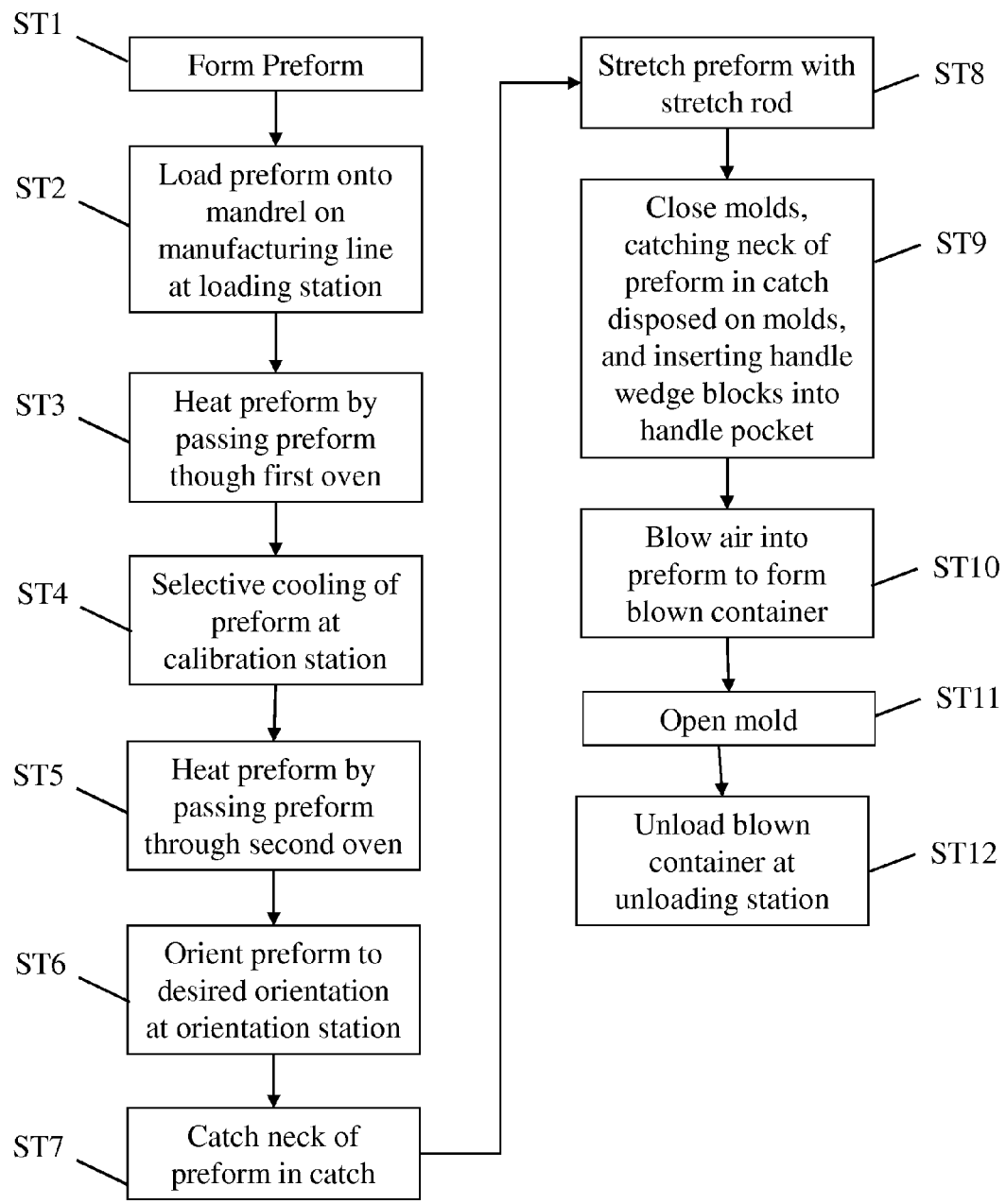
FIG. 5 is a flow chart showing a manufacturing method for forming a container with an integral handle from a preform, according to one or more embodiments of the present invention.

FIG. 5 is a flow chart showing a manufacturing method for forming a container 750 with an integral handle 770 from a preform 710, according to one or more embodiments of the present invention.

In a first step ST1 of the manufacturing method according to one or more embodiments of the present invention, a preform 710 is formed having an integral handle 720.

In a second step ST2, the preform 710 formed in the first step ST1 is loaded at a loading station 200 onto a mandrel 150 disposed on a conveyor 101 of a manufacturing line 100.

In a third step ST3, the conveyor 101 is rotated by the actuating wheels 110, 120 such that the mandrel 150 passes through a first oven 300, where the preform 710 and the integral handle 720 are selectively heated.

In a fourth step ST4, the conveyor 101 is rotated by the actuating wheels 110, 120 such that the mandrel 150 passes through a calibration station 130, where the preform 710 and/or integral handle 720 is selectively cooled.

In a fifth step ST5, the conveyor 101 is rotated by the actuating wheels 110, 120 such that the mandrel 150 passes through a second oven 300, where the preform 710 and the integral handle 720 are selectively heated.

In a sixth step ST6, the conveyor 101 is rotated by the actuating wheels 110, 120 such that the mandrel 150 is moved to an orientation station 140, where an orientation of the preform 710 is discerned, and the orientation is corrected to a desired orientation, if necessary.

In a seventh step ST7, the conveyor 101 is rotated by the actuating wheels 110, 120 such that the mandrel 150 is moved to a catch 160, 170 disposed on the manufacturing line 100, where the catch 160, 170 catches a neck portion 719 of the preform 710. According to one or more embodiments of the present invention, the catch 160, 170 is disposed at a mold station 500. Alternatively, according to one or more embodiments of the present invention, the catch 160, 170 may be disposed on the manufacturing line 100 at a position before the mold station 500.

In an eight step ST8, while the neck portion 719 is secured by the catch 160, 170, a stretch rod 180 stretches the preform 710 to form a stretched preform 730. If the catch 160, 170 is disposed at a position before the mold station 500, the conveyor 101 is rotated by the actuating wheels 110, 120 such that the mandrel 150 is moved to the mold station 500, so that the stretched preform 730 is disposed between the first mold 510 and the second mold 520, which are initially in an open position.

In a ninth step ST9, the first and second molds 510, 520 are brought together to a closed position, securing the neck portion 739 of the stretched preform 730 between first and second mold catches 530, 540 of the first and second molds 510, 520. According to one or more embodiments of the present invention, the first and second mold catches 530, 540 may be omitted from the first and second molds 510, 520, and the catch 160, 170 may keep the stretched preform 730 secured while the first and second molds 510, 520 are brought together to the closed position, which inserts upper and lower handle pocket wedge blocks 570, 580 into the handle pocket 745 of the stretched preform 730. Thus, the upper and lower handle pocket wedge blocks 570, 580 move the integral handle 740 into an expanded position.

In a tenth step ST10, air is blown into the stretched preform 730 to form the blown container 750. Alternatively, according to one or more embodiments of the present invention, the blowing of the air into the stretched preform 750 starts while the first and second molds 510, 520 are moving to the closed position, so that the movement of the integral handle 740 of the stretched preform 730 to the expanded position occurs concurrently with expansion of the stretched preform 730 during the blowing process.

Once the blowing process of the tenth step ST10 is completed, in an eleventh step ST11, the first and second molds 510, 520 are moved apart to an open position. The conveyor 101 is then rotated by the actuating wheels 110, 120 such that the mandrel 150 and the blown container 750 are moved to an unloading station 600.

In a twelfth step ST12, the blown container 750 is unloaded from the unloading station 600.

In the below descriptions of FIGS. 6A-15D, views are described relative to a direction from the calibration station 130 towards the unloading station 600 in FIG. 4. That is, with respect to FIGS. 6A-17D, "front view" is in the direction labeled "front" in FIG. 4, "back view" is in the direction labeled "back" in FIG. 4, "side view from the right side" is in a direction labeled "from right side" in FIG. 4, and "side view from the left side" is in a direction labeled "from left side" in FIG. 4. Additionally, in FIGS. 7A-9B, 12A-12B, and 15A-17D, the mandrel 150 is shown without the preform 710, the stretched preform 730, or the blown container 750 disposed thereon, so as to not clutter the drawings. However, during operation of the manufacturing line 100, a preform 710 may be disposed on the mandrel 150. Additionally, in FIGS. 6A-6B, the preform 710 is drawn without the integral handle 720, so as to not clutter the drawings. However, according to one or more embodiments of the present invention, the preform 710 may have an integral handle 720 thereon.

Figure 6A:
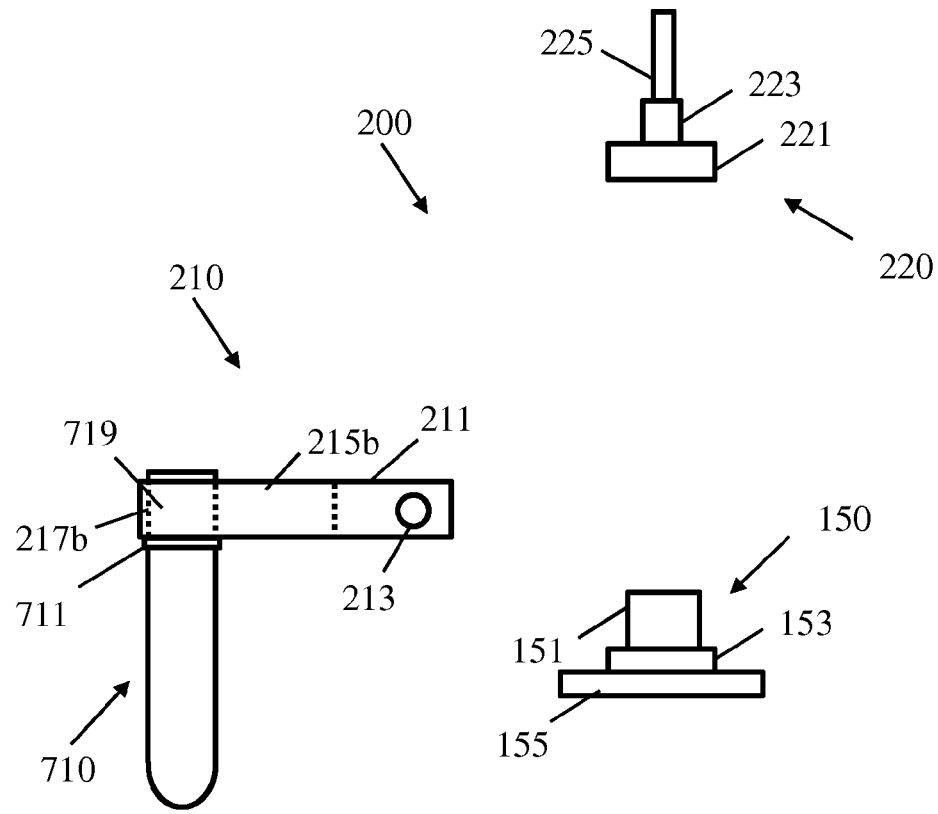
FIGS. 6A and 6B show front views of a loading station for loading a preform onto a manufacturing line, according to one or more embodiments of the present invention.
Figure 6B:
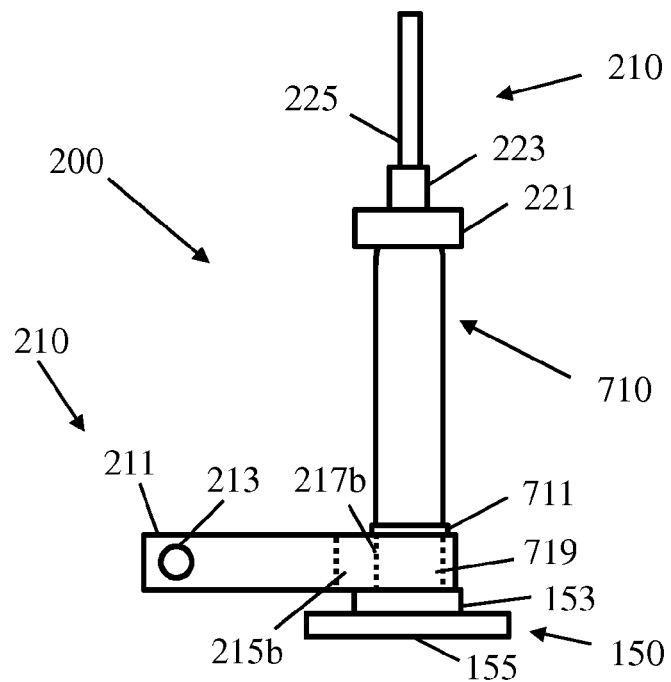
Figure 6C:
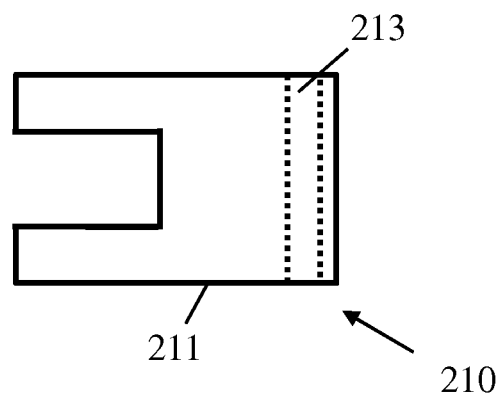
FIGS. 6C and 6D show top views of the loading station of FIGS. 6A and 6B, according to one or more embodiments of the present invention.
Figure 6D:
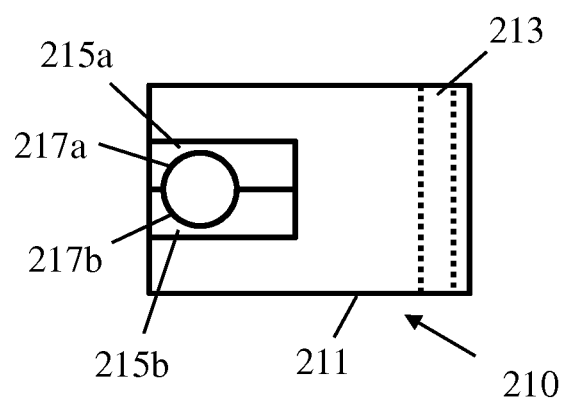

FIGS. 6A and 6B show front views, and FIGS. 6C and 6D show top views, of a loading station 200 for loading a preform 710 onto a mandrel 150 of a manufacturing line 100, according to one or more embodiments of the present invention. The mandrel 150 includes a base 155, an elevation 153 disposed on the base 155, and a ring-shaped cylindrical protrusion 151 disposed on the elevation 153. The loading station 200 includes a loading block 210 and a stomper 220.

The loading block 210 has a main body 211, a first loading gripper arm 215a with a semi-circular first loading gripping surface 217a, and a second loading gripper arm 215b with a semi-circular second loading gripping surface 217b. The first loading gripper arm 215a and the second loading gripper arm 215b are operable to move towards each other, such that the first loading gripping surface 217a and the second loading gripping surface 217b clamp around the neck portion 719 of the preform 710 to grab the preform 710. The loading block 210 is also rotatable about a rotational shaft 213 to position the preform 710 between the mandrel 150 and the stomper 220. The loading block 210 is also operable to move vertically down after rotation such that the preform 710 is placed on the mandrel 150. According to one or more embodiments of the present invention, the mandrel 150 includes a notch or a recess that engages with a notch or a recess disposed on the preform 710, such that the preform 710 can be accurately and precisely oriented with respect to the mandrel 150.

The stomper 220 includes a vertical rod 225, a connector 223 disposed on the bottom end of the vertical rod 225, and a cylindrical stomper head 221 disposed below the connector 223. According to one or more embodiments of the present invention, a bottom surface of the cylindrical stomper head 221 includes a curved recess that corresponds to the shape of the semi-spherical end portion 718. The stomper 220 is operable to move vertically downwards.

An operation of the loading station 200 according to one or more embodiments of the present invention will now be described with reference to FIGS. 6A-6D. The loading block 210, which is initially in the open position shown in FIG. 6C, is positioned as shown in FIG. 6A such that the first loading gripping surface 217*a* of the first loading gripper arm 215*a* and the second loading gripping surface 217*b* of the second loading gripper arm 215*b* surround two opposing sides of the neck portion 719 of the preform 710. The first loading gripper arm 215*a* and the second loading gripper arm 215*b* are then brought together as shown in FIG. 6D, such that the first loading gripping surface 217*a* and the second loading gripping surface 217*b* clamp the neck portion 719 of the preform 710. The loading block 210 is then rotated about the rotational shaft 213 to the rotated position shown in FIG. 6B. According to one or more embodiments of the present invention, the loading block 210 may also move vertically downwards after rotation, which inserts the protrusion 151 into the mouth 712 of the preform 710.

Once the preform 710 is disposed on the mandrel 150, the stomper 220 moves vertically down from the position shown in FIG. 6A to the position shown in FIG. 6B, such that the stomper head 221 presses down on the semi-spherical end portion 718 of the preform 710 to fully seat the preform 210 on the mandrel 150. The stomper 220 is operable to confirm that the preform 710 is fully seated on the mandrel 150, because if the preform is not fully seated on the mandrel 150, the preform may hit one of the heating elements of the first heating bank 310.

Figure 7A:
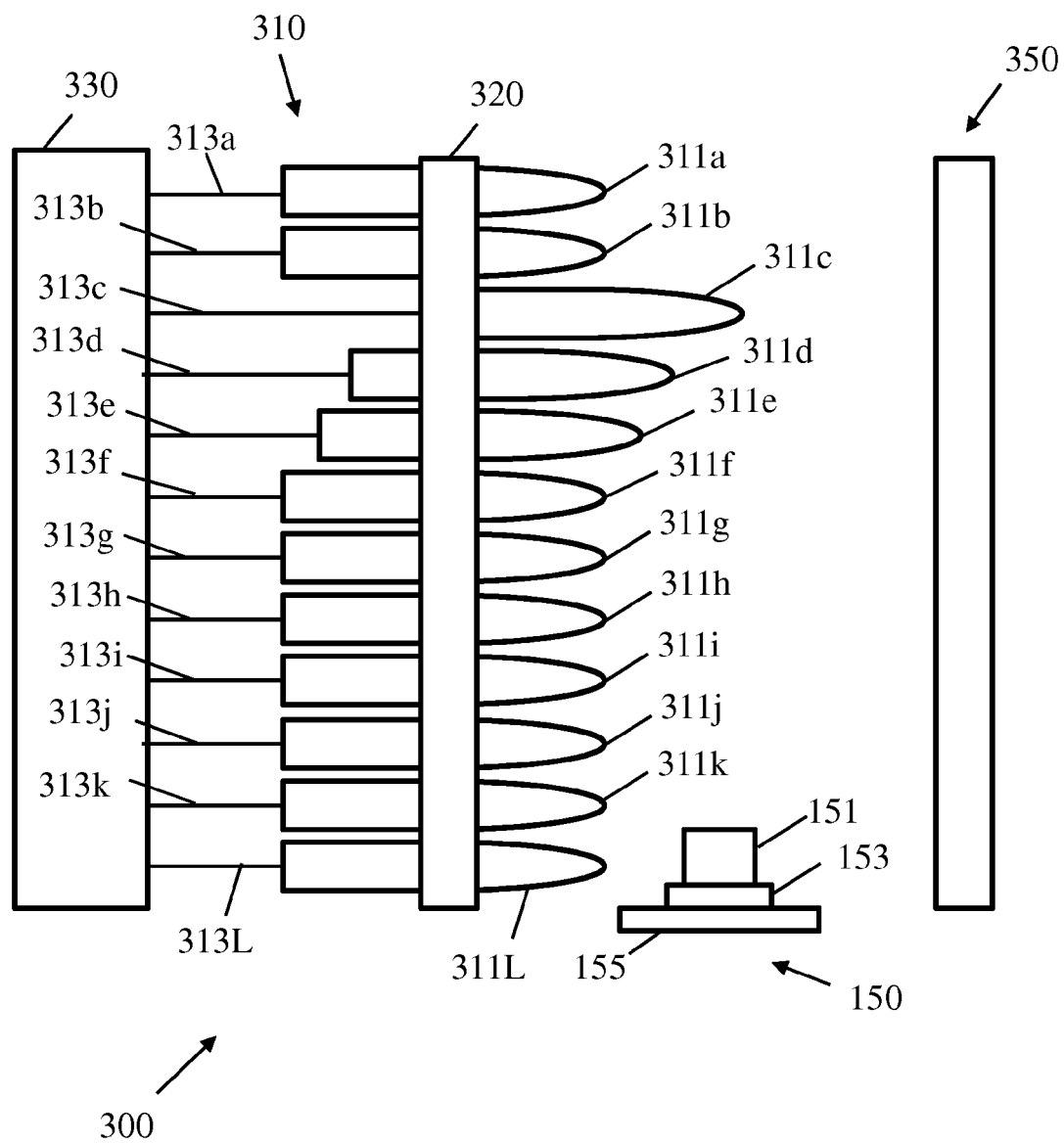
FIG. 7A shows a front view.

FIG. 7A shows a front view, and FIG. 7B shows a top view, of a first oven 300 according to one or more embodiments of the present invention. FIG. 7C shows a side view from the right side of a first heating bank 310 according to one or more embodiments of the present invention. Although FIGS. 7A and 7*b* show the mandrel 150 without a preform 710 disposed thereon in the interest of not cluttering the figures, when the mandrel 150 passes through the first oven 300, the mandrel 150 may have a preform 710 disposed thereon, so that the preform 710 undergoes preferential heating while passing through the first oven 300.

The first oven 300 includes a first heating bank 310 and a reflector plate 350. The mandrel 150 and the preform 710 disposed thereon pass through the first oven 300 between the first heating bank 310 and the reflector plate 350. According to one or more embodiments of the present invention, the reflector plate 350 is a rectangular shaped board operable to reflect heat from the first heating bank 310 back towards the preform 710. The reflector plate 350 may have sufficient thickness to contain heat from the first heating bank 310. Although the embodiments shown in the drawings include a first heating bank 310 on one side of the mandrel 150 and the reflector plate 350 on the other side of the mandrel 150, one or more embodiments of the present invention may have heating banks on both sides of the mandrel 150, such that the preform 710 is actively heated from both sides. According to one or more embodiments of the present invention, the reflector plate 350 is cooled.

The first heating bank 310 includes a heating element holder 320 which holds a plurality of pairs of heating element ends 311*a*-311L. Cylindrical heating elements 312*a*-312L are disposed between each pair of heating element ends 311*a*-311L. The heating element holder 320 has a plurality of through-holes in which the heating element ends 311*a*-311L are inserted. As shown in FIG. 7C, the pairs of heating element ends 311*a*-311L with the heating elements 312*a*-312L therebetween are disposed horizontally parallel in the heating element holder 320. Although the embodiments shown in the drawings have a 12 heating elements 312*a*-312L, the first heating bank 310 may have any number of heating elements. As shown in FIGS. 7A and 7B, the pairs of heating element ends 311*a*-311L with the heating elements 312*a*-312L therebetween are individually movable in the left and right side directions. Thus, each of the heating elements 312*a*-312L can be moved towards or away from the reflector plate 350. Therefore, the distance between each of the heating elements 312*a*-312L and the preform 710 can be precisely controlled, which allows for preferential heating of different areas of the preform 710. A first heating bank controller 330 is disposed behind the first heating bank 310, and each of the heating element ends 311*a*-311L has first heating bank wiring 313*a*-313L electrically connecting the heating elements 312*a*-312L and the first heating bank controller 330 through the heating element ends 311*a*-311L. According to one or more embodiments of the present invention, the first heating bank controller 330 both controls and supplies energy to the heating elements 312*a*-312L through the first heating bank wiring 313*a*-313L and the heating element ends 311*a*-311L.

In the embodiments shown in FIGS. 7A and 7B, the third heating element 312*c* is closer to the reflector plate 350 than the other heating elements, and with the fourth and fifth heating elements 312*d*-312*e*, the distance between the heating elements and the reflector plate 350 is gradually increased. Thus, the front view profile of the heating elements 312*a*-312L corresponds to the shape of the preform 710, so that the heating elements 312*a*-312L surround the preform 710 from the left side to the top. However, the arrangement of the heating elements 312*a*-312L are not limited to those shown, and the distance between each of the heating elements 312*a*-312L and the reflector plate 350 can be varied depending on the shape of the preform, as well as the desired preferential heating. Additionally, each of the heating elements 312*a*-312L can be independently controlled by the first heating bank controller 330, such that the intensity of the heat emitted by each of the heating elements 312*a*-312L can be individually adjusted as desired for different applications.

An operation of the first oven 300 according to one or more embodiments of the present invention will now be described with reference to FIGS. 7A-7C. The mandrel 150 with the preform 710 disposed thereon is passed through the first oven 300 between the first heating bank 310 and the reflector plate 350 by the conveyor 101 on which the mandrel 150 is disposed. As the preform 710 passes through the first oven 300, the preform 710 is preferentially heated by the heating elements 312*a*-312L, which are controlled by the first heating bank controller 330.

Figure 8A:
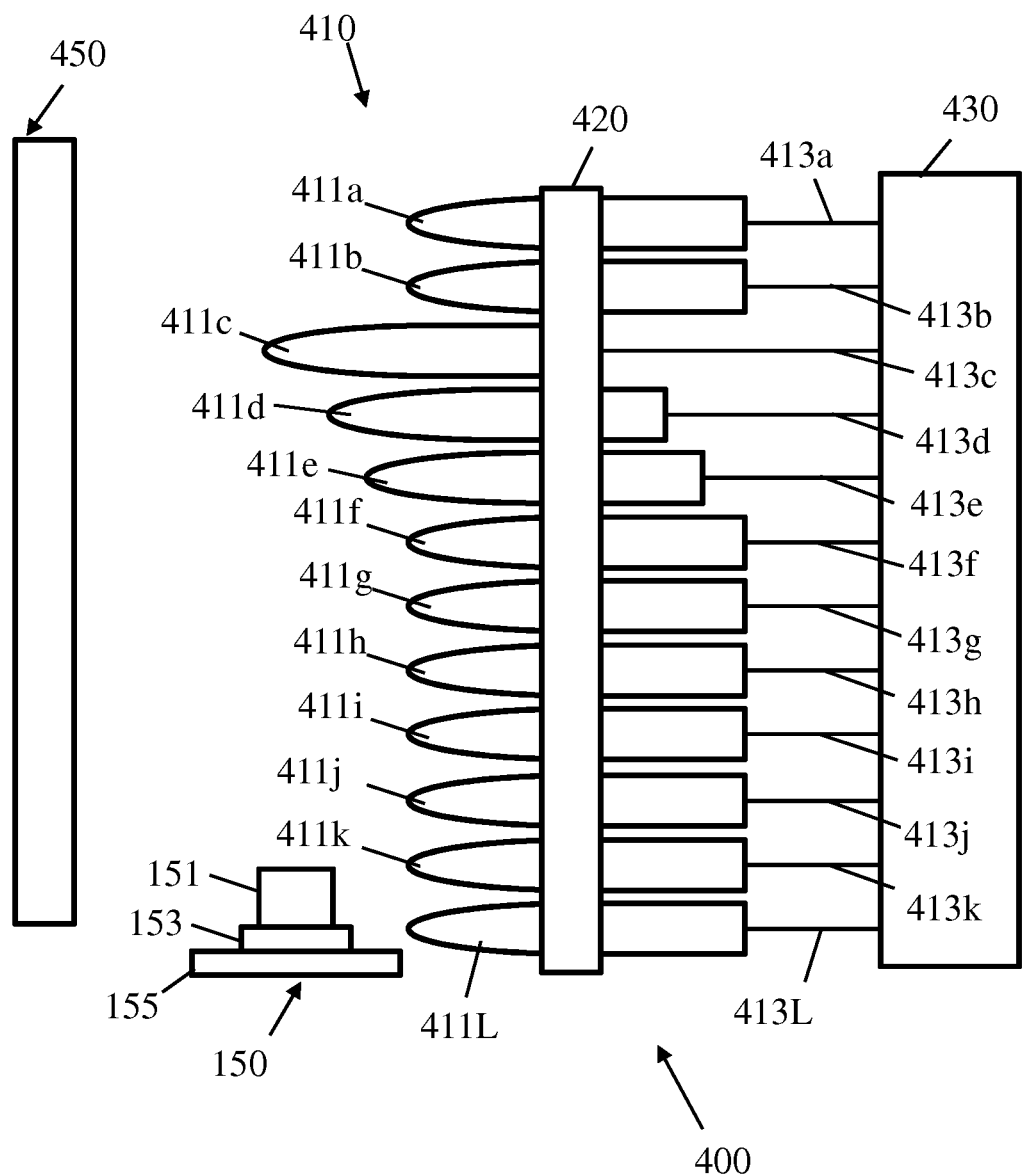
FIG. 8A shows a front view.
Figure 8C:
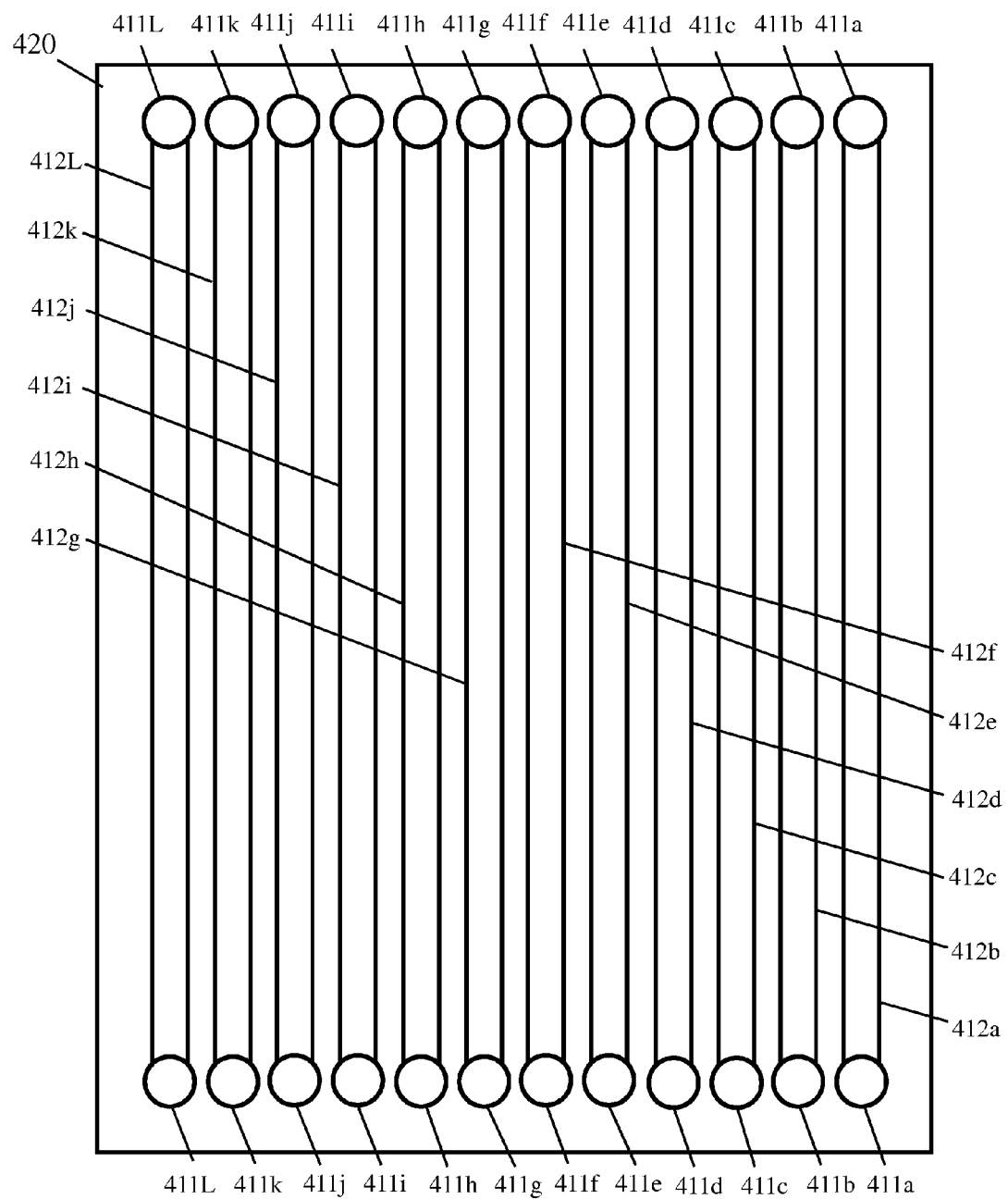
FIG. 8C shows a side view from the left side of a second heating bank according to one or more embodiments of the present invention.

FIG. 8A shows a front view, and FIG. 8B shows a top view, of a second oven 400 according to one or more embodiments of the present invention. FIG. 8C shows a side view from the left side of a second heating bank 410 according to one or more embodiments of the present invention. Although FIGS. 8A and 8*b* show the mandrel 150 without a preform 710 disposed thereon in the interest of not cluttering the figures, when the mandrel 150 passes through the second oven 400, the mandrel 150 may have a preform 710 disposed thereon, so that the preform 710 undergoes preferential heating while passing through the second oven 400.

The second oven 400 includes a second heating bank 410 and a reflector plate 450. The mandrel 150 and the preform 710 disposed thereon pass through the second oven 400 between the second heating bank 410 and the reflector plate 450. According to one or more embodiments of the present invention, the reflector plate 450 is a rectangular shaped board operable to reflect heat from the second heating bank 410 back towards the preform 710. The reflector plate 450 may have sufficient thickness to contain heat from the second heating bank 410. Although the embodiments shown in the drawings include a second heating bank 410 on one side of the mandrel 150 and the reflector plate 450 on the other side of the mandrel 150, one or more embodiments of the present invention may have heating banks on both sides of the mandrel 150, such that the preform 710 is actively heated from both sides. According to one or more embodiments of the present invention, the reflector plate 450 is cooled.

The second heating bank 410 includes a heating element holder 420 which holds a plurality of pairs of heating element ends 411a-411L. The heating element holder 420 has a plurality of through-holes in which the heating element ends 411a-411L are inserted. As shown in FIG. 8C, the pairs of heating element ends 411a-411L with the heating elements 412a-412L therebetween are disposed horizontally parallel in the heating element holder 420. Although the embodiments shown in the drawings have 12 heating elements 412a-412L, the second heating bank 410 may have any number of heating elements. As shown in FIGS. 8A and 8B, the pairs of heating element ends 411a-411L with the heating elements 412a-412L therebetween are individually movable in the left and right side directions. Thus, each of the heating elements 412a-412L can be moved towards or away from the reflector plate 450. Therefore, the distance between each of the heating elements 412a-412L and the preform 710 can be precisely controlled, which allows for preferential heating of different areas of the preform 710. A second heating bank controller 430 is disposed behind the second heating bank 410, and each of the heating element ends 411a-411L has second heating bank wiring 413a-413L electrically connecting the heating elements 412a-412L and the second heating bank controller 430 through the heating element ends 411a-411L. According to one or more embodiments of the present invention, the second heating bank controller 430 both controls and supplies energy to the heating elements 412a-412L through the second heating bank wiring 413a-413L and the heating element ends 411a-411L.

In the embodiments shown in FIGS. 8A and 8B, a third heating element 312c is closer to the reflector plate 450 than the other heating elements, and with the fourth and fifth heating elements 412d-412e, the distance between the heating elements and the reflector plate 450 is gradually increased. Thus, the front view profile of the heating elements 412a-412L corresponds to the shape of the preform 710, and surrounds the preform 710 from the right side to the top. However, the arrangement of the heating elements 412a-412L are not limited to those shown, and the distance between each of the heating elements 412a-412L and the reflector plate 450 can be varied depending on the shape of the preform, as well as the desired preferential heating. Additionally, each of the heating elements 412a-412L can be independently controlled by the second heating bank controller 430, such that the intensity of the heat emitted by each of the heating elements 412a-412L can be individually adjusted as desired for different applications.

An operation of the second oven 400 according to one or more embodiments of the present invention will now be described with reference to FIGS. 8A-8C. After the calibration station 130, the mandrel 150 with the preform 710 disposed thereon is passed through the second oven 400 between the second heating bank 410 and the reflector plate 450 by the conveyor 101 on which the mandrel 150 is disposed. As the preform 710 passes through the second oven 400, the preform 710 is preferentially heated by the heating elements 412a-412L, which are controlled by the second heating bank controller 430.

Figure 9A:
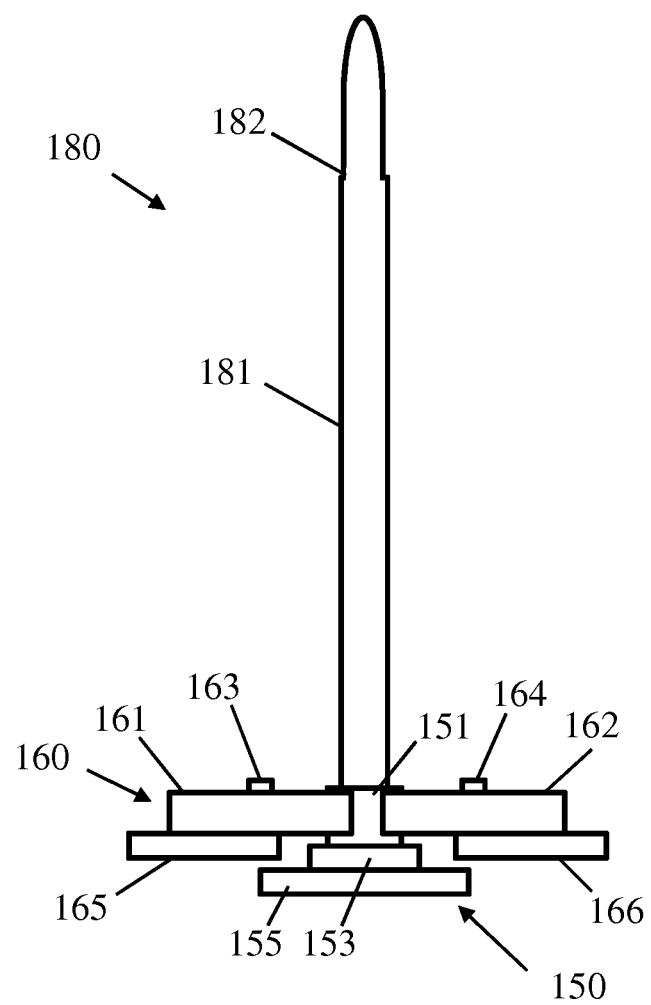
FIG. 9A shows a front view of a stretch rod according to one or more embodiments of the present invention.

FIG. 9A shows a front view of a stretch rod 180 according to one or more embodiments of the present invention. The mandrel 150 on which the preform 710 is disposed is moved by the conveyor 101 to a position on the manufacturing line 100 where the catch 160 is disposed. According to one or more embodiments of the present invention, the catch 160 includes a first turnstile 161 turnably secured on a base 165 by a vertical shaft 163, and a second turnstile 162 turnably secured on a base 166 by a vertical shaft 164. The first and second turnstiles 161, 162 are turnable about the vertical shafts 163, 164 with respect to the bases 165, 166, to catch a neck portion 719 of the preform 710. The catch 160 shown in FIGS. 9A-9B, as well as an additional embodiment of a catch 170, will be explained in more detail later with respect to FIGS. 10A-11B. The stretch rod 180 includes a stretch rod body 181 that is configured to extend upwards through a hole in the ring-shaped protrusion 151 of the mandrel 150. According to one or more embodiments of the present invention, the bases 165, 166 are part of the manufacturing line 100, such that the catch 160 is disposed on the manufacturing line 100.

An operation of the stretch rod 180 will now be described with reference to FIG. 9A. Once the catch 160 secures the neck portion 719 of the preform 710, the stretch rod body 181 extends upwards through the hole in the ring-shaped protrusion 151. As the stretch rod body 181 extends upwards, the tip of the stretch rod body 181 pushes on the semi-spherical end portion 718 and stretches the preform 710, which has been heated in the first and second ovens 300, 400, to form a stretched preform 730. Additionally, as the stretch rod body 181 stretches the preform 710, a second attachment point 722 of the integral handle 720 is moved to the position of the second attachment point 742 of the stretched preform 730, which uncoils the U-shaped portion 723, forming a longer straight handle portion 744, as shown in FIG. 2.

According to one or more embodiments of the present invention, the stretch rod 180 may be a stepped stretch rod, having a stepped portion 182. When the stretch rod body 181 is extended into the preform 710, after the tip of the stretch rod body 181 pushes on the semi-spherical end portion 718 and stretches the preform 710 for a distance, the stepped portion 182 of the stretch rod 180 catches on the second contact ring 726 of the preform 710, and stretches the preform 710 further. Because the second contact ring 726 is disposed at the second attachment point 722, the stepped portion 182 can accurately move the second attachment point 722 to the desired position.

Figure 9B:
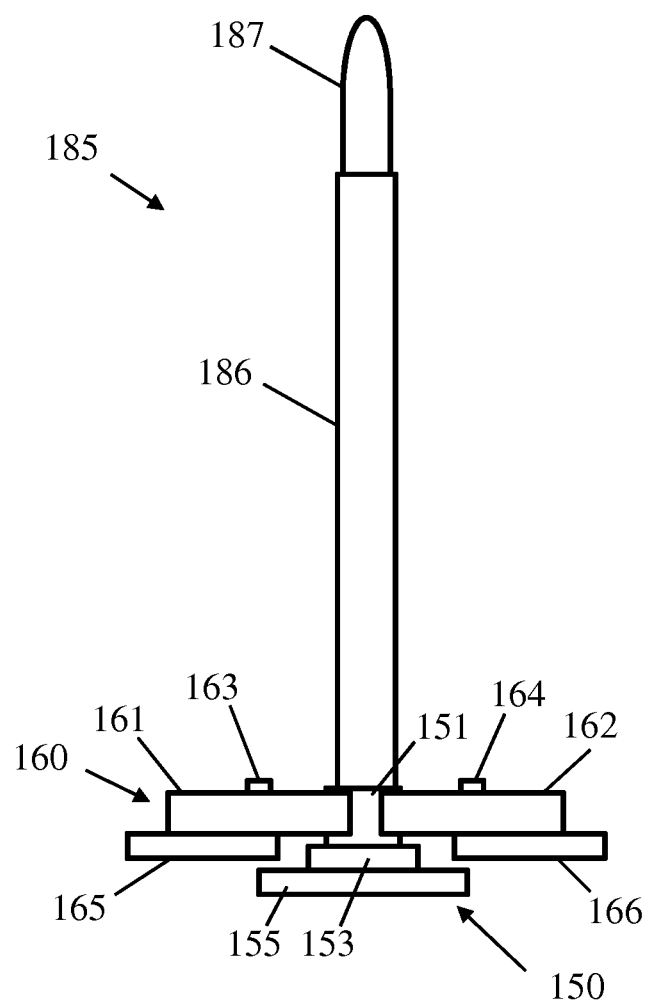
FIG. 9B shows a front view of a multi-stage stretch rod according to one or more embodiments of the present invention.

FIG. 9B shows a front view of a multi-stage stretch rod 185 according to one or more embodiments of the present invention. In FIG. 9B, the catch 160 is similar to that shown in FIG. 9A and, therefore, description of the catch 160 is omitted. The multi-stage stretch rod 185 includes a first stage stretch rod body 186 and a second stage stretch rod body 187.

An operation of the multi-stage stretch rod 185 will now be described with reference to FIG. 9B. Once the catch 160 secures the neck portion 719 of the preform 710, the first stage stretch rod body 186 extends upwards through the hole in the ring-shaped protrusion 151. As the first stage stretch rod body 186 extends upwards, the first stage stretch rod body 186 catches on second contact ring 726 formed on an inner circumference at the second attachment point 722 of the preform 710, and the first stage stretch rod body 186 stretches the preform 710, which has been heated in the first and second ovens 300, 400, to a first stretched position. Because the second contact ring 726 is disposed at the second attachment point 722, the first stage stretch rod body 186 can accurately move the second attachment point 722 to the desired position. Then, the second stage stretch rod body 187 extends upwards from the top end of the first stage stretch rod body 186, stretching the preform 710 further to form a stretched preform 730. As with the stretch rod 180, as the first stage stretch rod body 186 stretches the preform 710, a second attachment point 722 of the integral handle 720 is moved to the position of the second attachment point 742 of the stretched preform 730, which uncoils the U-shaped portion 723, forming a longer straight handle portion 744, as shown in FIG. 2. By dividing the stretching process of the preform 710 into two stages, the movement of the second attachment point 722 can be more precisely controlled.

While the multi-stage stretch rod 185 described above includes two stages, according to one or more embodiments of the present invention, the multi-stage stretch rod 185 may have more than two stages.

Figure 10A:
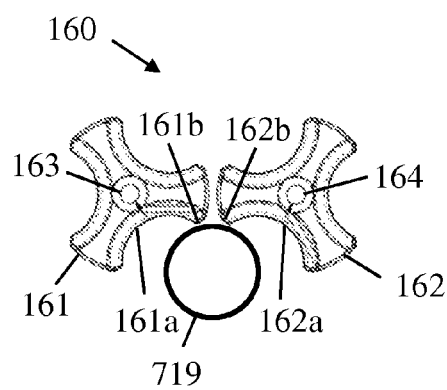
FIGS. 10A-10B show top views of a turnstile-type catch for catching a neck portion of a preform, according to one or more embodiments of the present invention.
Figure 10B:
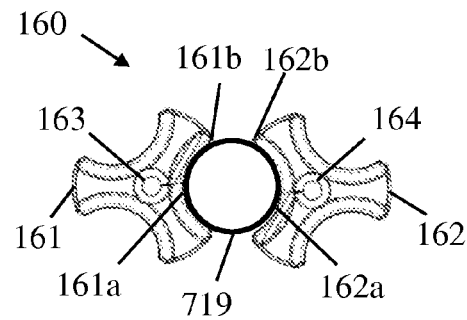

FIGS. 10A-10B show top views of a turnstile-type catch 160 for catching a neck portion 719 of a preform 710, according to one or more embodiments of the present invention. According to one or more embodiments of the present invention, the catch 160 includes a first turnstile 161 turnably secured on a base 165 by a vertical shaft 163, and a second turnstile 162 turnably secured on a base 166 by a vertical shaft 164. The first turnstile 161 includes three semicircular catching surfaces 161a and three tapered leading edges 161b, and the second turnstile 162 includes three semicircular catching surfaces 162a and three tapered leading edges 162b. The first and second turnstiles 161, 162 are turnable about the vertical shafts 163, 164 with respect to the bases 165, 166, to catch a neck portion 719 of the preform 710. According to one or more embodiments of the present invention, the bases 165, 166 are part of the manufacturing line 100, such that the catch 160 is disposed on the manufacturing line 100.

An operation of the turnstile-type catch 160 will now be described with reference to FIGS. 10A and 10B. The first and second turnstiles 161, 162 are disposed on the same horizontal plane as the neck portion 719 of the preform 710 disposed on the mandrel 150. As the preform 710 is moved towards the catch 160, the neck portion 719 pushes on one of the three tapered leading edges 161b, 162b for each of the first and second turnstiles 161, 162. Thus, the first turnstile 161 is turned counter-clockwise and the second turnstile 162 is turned clockwise about the vertical shafts 163, 164, from the open position shown in FIG. 10A to the secured position shown in FIG. 10B. One of the three catching surfaces 161a of the first turnstile 161 and one of the three catching surfaces 162a of the second turnstile 162 secure the neck portion 719 within the catch 160. The preform 710 is then stretched by a stretch rod 180, 185 to form a stretched preform 730. To release the preform 710 from the catch 160, the preform 710 is moved further forward, which causes the neck portion 719 to further rotate the first and second turnstiles 161, 162, allowing the preform 710 to escape the catch 160.

Figure 11A:
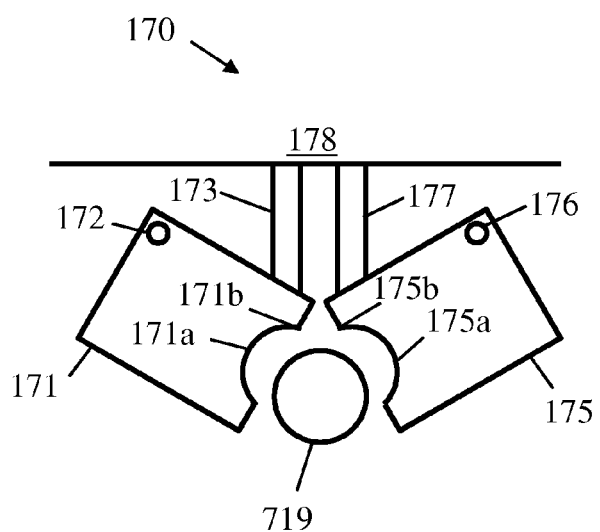
FIGS. 11A-11B show top views of a spring-loaded catch for catching a neck portion of a preform, according to one or more embodiments of the present invention.
Figure 11B:
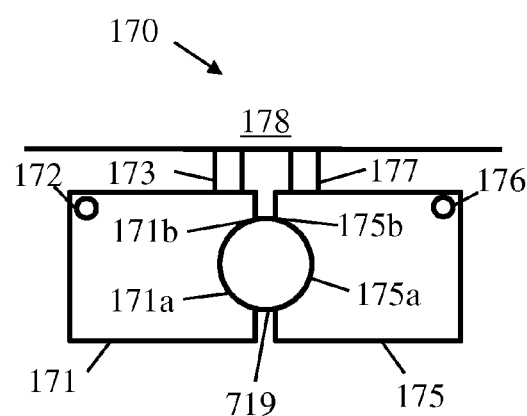

FIGS. 11A-11B show top views of a spring-loaded catch 170 for catching a neck portion 719 of a preform 710, according to one or more embodiments of the present invention. According to one or more embodiments of the present invention, the spring-loaded catch 170 includes a first catch body 171 that is turnable about a vertical shaft 172, and that is spring-biased by a spring 173 secured to a base 178, and a second catch body 175 that is turnable about a vertical shaft 176, and that is spring-biased by a spring 177 secured to the base 178. The first catch body 171 includes a semicircular catching surface 171a and a leading edge 171b, and the second catch body 175 includes a semicircular catching surface 175a and a leading edge 175b. According to one or more embodiments of the present invention, the leading edges 171b, 175b of the first and second catch bodies 171, 175 are tapered surfaces. The first and second catch bodies 171, 175 are turnable about the vertical shafts 172, 176, to catch a neck portion 719 of the preform 710. According to one or more embodiments of the present invention, the base 178 is part of the manufacturing line 100, such that the catch 170 is disposed on the manufacturing line 100.

An operation of the spring-loaded catch 170 will now be described with reference to FIGS. 11A and 11B. The first and second catch bodies 171, 175 are disposed on the same horizontal plane as the neck portion 719 of the preform 710 disposed on the mandrel 150. As the preform 710 is moved towards the catch 170, the neck portion 719 pushes on the leading edges 171b, 175b of the first and second catch bodies 171, 175. Thus, the first catch body 171 is turned counter-clockwise and the second catch body 175 is turned clockwise about the vertical shafts 172, 176, from the open position shown in FIG. 11A to the secured position shown in FIG. 11B. The catching surface 171a of the first catch body 171 and the catching surface 175a of the second catch body 175 secure the neck portion 719 within the catch 170. The preform 710 is then stretched by a stretch rod 180, 185 to form a stretched preform 730. To release the stretched preform 730 from the catch 170, the catch 170 is moved vertically downwards away from the horizontal plane of the neck portion 739, which releases the neck portion 739 from the catch 170, while the springs 173, 177 push the first and second catch bodies 171, 175 back to the open position. After the stretched preform 739 is moved away from the catch 719 on the conveyor 101, the catch 170 is moved vertically upwards back to the initial horizontal plane.

Figure 12C:
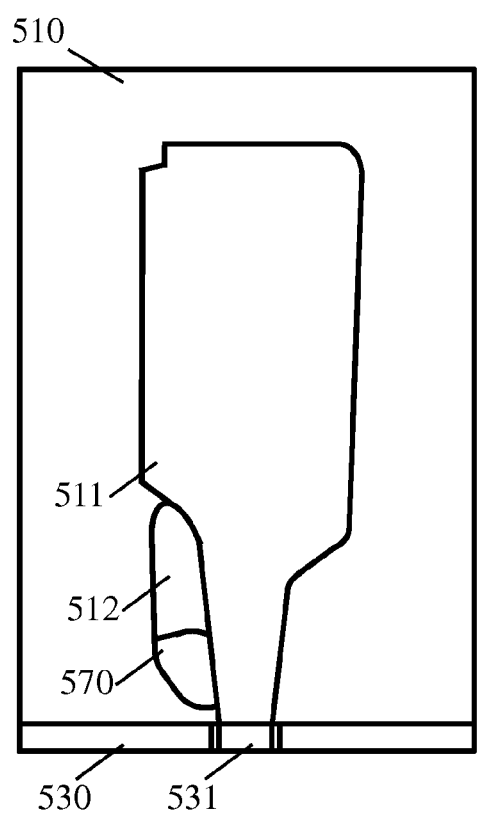
FIG. 12C shows a side view from the right side of the first mold.
Figure 12D:
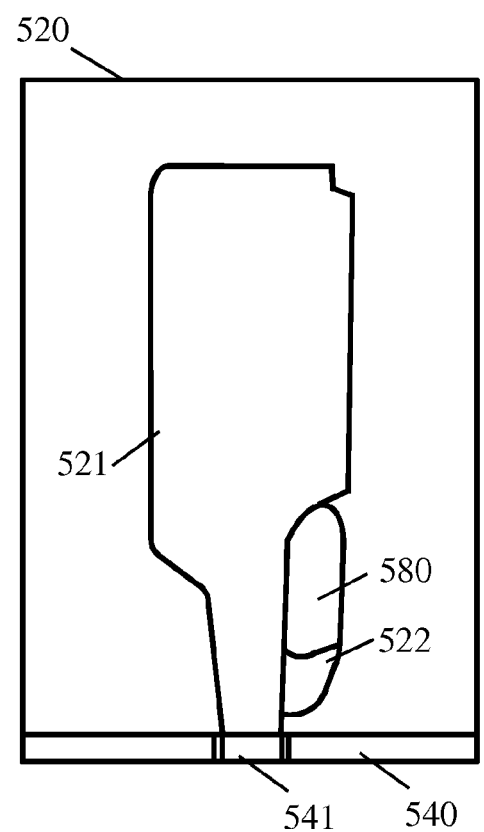
FIG. 12D shows a side view from the left side of the second mold, according to one or more embodiments of the present invention.
Figure 12E:
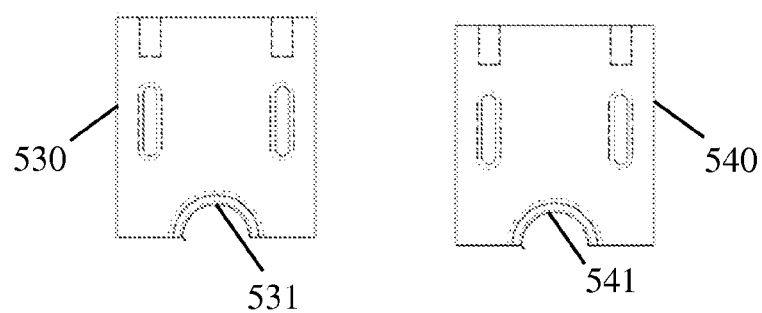
FIG. 12E shows a bottom view of first and second mold catches, according to one or more embodiments of the present invention.

FIG. 12A shows a front view of a mold station with open first and second molds 510, 520, and FIG. 12B shows a front view of a mold station with closed front and second molds 510, 520, according to one or more embodiments of the present invention. FIG. 12C shows a side view from the right side of the first mold 510, and FIG. 12D shows a side view from the left side of the second mold 520, according to one or more embodiments of the present invention. FIG. 12E shows a bottom view of the first and second mold catches 530, 540, according to one or more embodiments of the present invention.

The mold station 500 includes a first mold 510 and a second mold 520. According to one or more embodiments of the present invention, each of the first mold 510 and the second mold 520 is half of a complete mold, such that when the first mold 510 and the second mold 520 are brought together, a complete mold is formed. A first mold catch 530 is disposed at the bottom of the first mold 510, and a second mold catch 540 is disposed at the bottom of the second mold 520. As shown in FIG. 12A, the first mold 510 includes a first mold catch spring 533, and the second mold 520 includes a second mold catch spring 543 that spring-biases the first and second mold catches 530, 540 towards each other. As shown in FIG. 12C, the first mold has a mold recess 511 in the shape of one side of the desired container, a lower handle recess 512, and an upper handle pocket wedge block 570. As shown in FIG. 12D, the second mold has a mold recess 521 in the shape of the other side of the desired container, an upper handle recess 522, and a lower handle pocket wedge block 580. The upper handle pocket wedge block 570 and the lower handle pocket wedge block 580 are described in more detail later with reference to FIGS. 13A-13F and 14A-14F. The first mold catch 530 includes a semicircular first mold catching surface 531, and the second mold catch 540 includes a semicircular second mold catching surface 541.

An operation of the mold station 500 will now be described with reference to FIGS. 12A-12E. The first and second molds 510, 520 are initially in the open position shown in FIG. 12A. Once the stretched preform 730 disposed on the mandrel 150 is positioned between the first and second molds 510, 520, the first and second molds 510, 520 are brought together to the closed position shown in FIG. 12B. As the first and second molds 510, 520 are brought together, the first and second mold catching surfaces 531, 541 of the first and second mold catches 530, 540 are brought together around the neck portion 739 of the stretched preform 730, and the neck portion 739 of the stretched preform 730 is secured by the first and second mold catches 530, 540. Additionally, as the first and second molds 510, 520 are brought together, the first and second mold catches 530, 540 move rearwards with respect to the first and second molds 510, 520, compressing the first mold catch spring 533 and the second mold catch spring 543, such that the first mold 510 and the second mold 520 abuts against each other. According to one or more embodiments of the present invention, the second catches 530, 540 may be omitted from the first and second molds 510, 520, and the catch 160, 170 may keep the stretched preform 730 secured while the first and second molds 510, 520 are brought together to the closed position. As the first and second molds 510, 520 are brought together, the upper handle pocket wedge block 570 that protrudes from the first mold 510 is inserted into an upper part of the handle pocket 745 of the stretched preform 730, and into the upper handle recess 522 of the second mold 520. Similarly, as the first and second molds 510, 520 are brought together, the lower handle pocket wedge block 580 that protrudes from the second mold 520 is inserted into a lower part of the handle pocket 745 of the stretched preform 730, and into the lower handle recess 512 of the first mold 510. The tapered cam surface 573 of the upper handle pocket wedge block 570 and the tapered cam surface 583 of the lower handle pocket wedge block 580 function as cams on the integral handle 740, pushing the integral handle 740 into an expanded position.

Once the first and second molds 510, 520 are in the closed position shown in FIG. 12B, air is blown into the stretched preform 730 to form the blown container 750. Alternatively, according to one or more embodiments of the present invention, the blowing of the air into the stretched preform 750 starts while the first and second molds 510, 520 are moving to the closed position, so that the movement of the integral handle 740 of the stretched preform 730 to the expanded position occurs concurrently with expansion of the stretched preform 730 during the blowing process. Once the blowing process is complete, and the stretch preform 730 has expanded to fill the first mold recess 511 and the second mold recess 521 to form the blown container 750, the first and second molds 510, 520 are moved apart to the open position shown in FIG. 12A.

Although embodiments are described above in which the stretched preform 730 is placed in the first and second molds 510, 520 in the open position, the invention is not limited thereto. In one or more embodiments of the present invention, a preform 710 may be moved to the mold station 500, and the first and second molds 510, 520 may be brought together around the preform 710, securing the neck portion 719 of the preform in the first and second mold catching surfaces 531, 541. The stretch rod 180, 185 may then be extended upwards to stretch the preform 710 within the closed first and second molds 510, 520 to form the stretched preform 730. However, to do so, the upper and lower handle pocket wedge blocks 570, 580 may be required to be inserted into the first and second molds 510, 520 after the stretching is performed.

Additionally, although embodiments are described above in which the upper and lower handle pocket wedge blocks 570, 580 are inserted into the handle pocket 745 of the stretched preform 730 from opposite sides, the invention is not limited thereto. According to one or more embodiments of the present invention, one of the first and second molds 510, 520 may have a single handle pocket wedge block that takes up the entirety of the handle pocket 745 to expand the handle pocket 745 by itself.

Figure 13A:
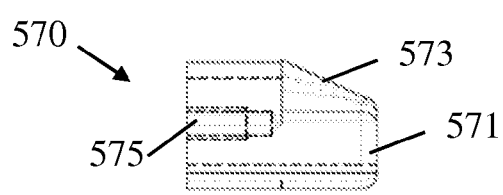
FIGS. 13A-13D show back, front, top, and bottom views.
Figure 13B:
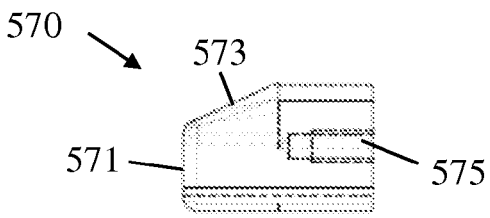
Figure 13C:
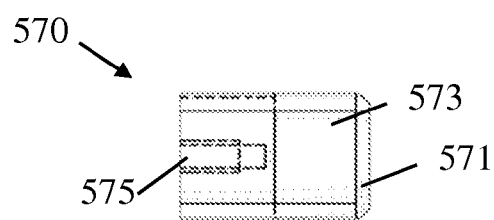
Figure 13D:
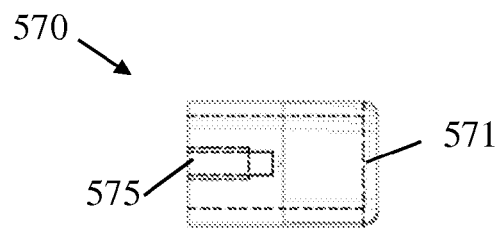
Figure 13E:
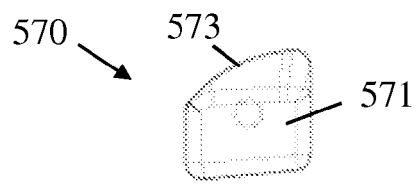
FIGS. 13E-13F show side views from the right side and the left side, of an upper handle pocket wedge block of the first mold, according to one or more embodiments of the present invention.
Figure 13F:
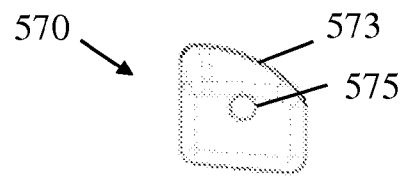

FIGS. 13A-13D show back, front, top, and bottom views, and FIGS. 13E-13F show sides views from the right side and the left side views, of an upper handle pocket wedge block 570 of the first mold 510, according to one or more embodiments of the present invention. According to one or more embodiments of the present invention, the upper handle pocket wedge block 570 includes a leading edge 571, a tapered cam surface 573, and a pin insertion hole 575. A corresponding pin on the first mold 510 is inserted into the pin insertion hole 575 to secure the upper handle pocket wedge block 570 to the first mold 510. Alternatively, the upper handle pocket wedge block 570 may be formed integrally with the first mold 510. As the first and second molds 510, 520 are brought together, the leading edge 571 is inserted into the upper portion of the handle pocket 745 of the stretched preform 730, and the tapered cam surface 573 pushes outwards on the integral handle 740. Because the tapered cam surface 573 increases in diameter towards the back, as the upper handle pocket wedge block 570 is inserted further into the handle pocket 745, the tapered cam surface 573 causes the upper part of the integral handle 740 to expand to the integral handle 770 of the blown container 750.

Figure 14A:
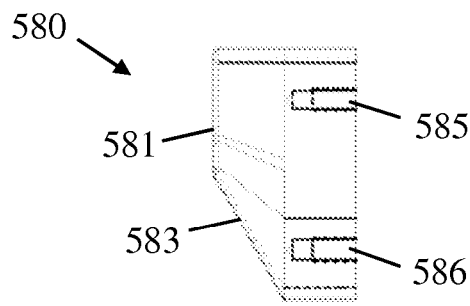
FIGS. 14A-14D show back, front, top, and bottom views.
Figure 14B:
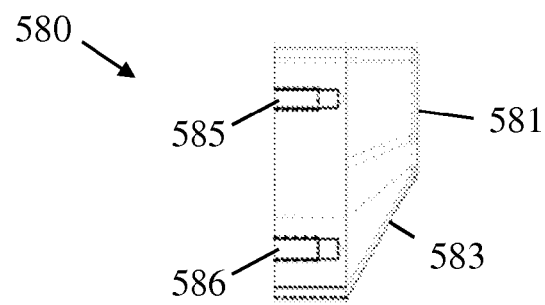
Figure 14C:
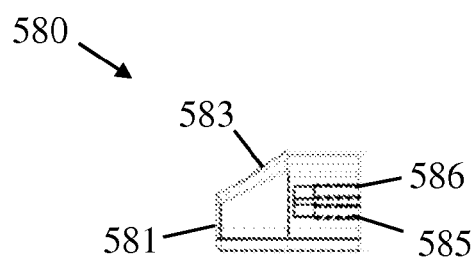
Figure 14D:
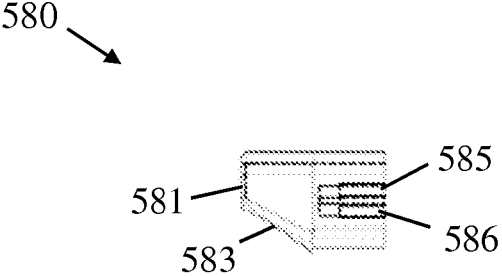
Figure 14E:
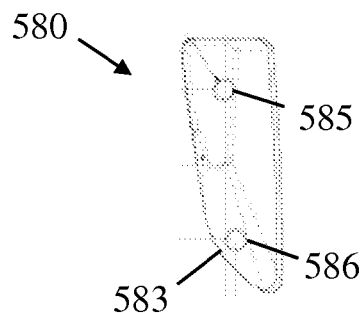
FIGS. 14E-14F show side views from the right side and left side, of a lower handle pocket wedge block of the second mold, according to one or more embodiments of the present invention.
Figure 14F:
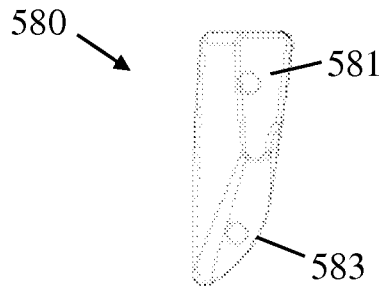

FIGS. 14A-14D show back, front, top, and bottom views, and FIGS. 14E-14F show side views from the right side and the left side, of a lower handle pocket wedge block 580 of the second mold 520, according to one or more embodiments of the present invention. According to one or more embodiments of the present invention, the lower handle pocket wedge block 580 includes a leading edge 581, a tapered cam surface 583, and two pin insertion holes 585, 586. Corresponding pins on the second mold 520 is inserted into the pin insertion holes 585, 586 to secure the lower handle pocket wedge block 580 to the second mold 520. Alternatively, the lower handle pocket wedge block 580 may be formed integrally with the second mold 520. As the first and second molds 510, 520 are brought together, the leading edge 581 is inserted into the lower portion of the handle pocket 745 of the stretched preform 730, and the tapered cam surface 583 pushes outwards on the integral handle 740. Because the tapered cam surface 583 increases in diameter towards the back, as the lower handle pocket wedge block 580 is inserted further into the handle pocket 745, the tapered cam surface 583 causes the lower part of the integral handle 740 to expand to the integral handle 770 of the blown container 750.

Figure 15A:
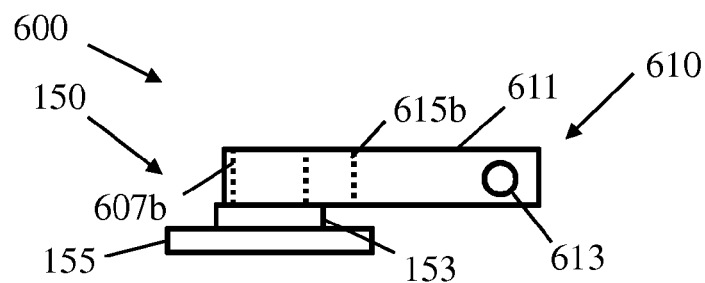
FIGS. 15A-15B show side views from the right side of an unloading station for unloading a blown container from a manufacturing line, according to one or more embodiments of the present invention.
Figure 15B:
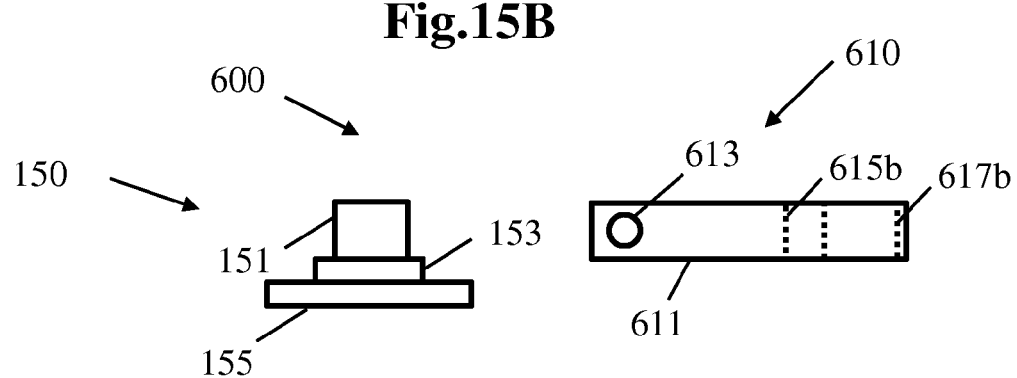
Figure 15C:
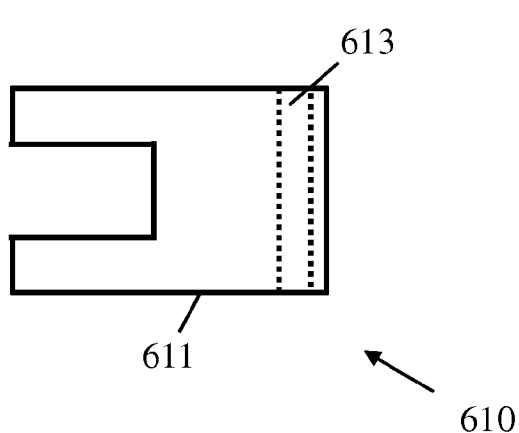
FIGS. 15C-15D show top views of the unloading station of FIGS. 15A-15B, according to one or more embodiments of the present invention.
Figure 15D:
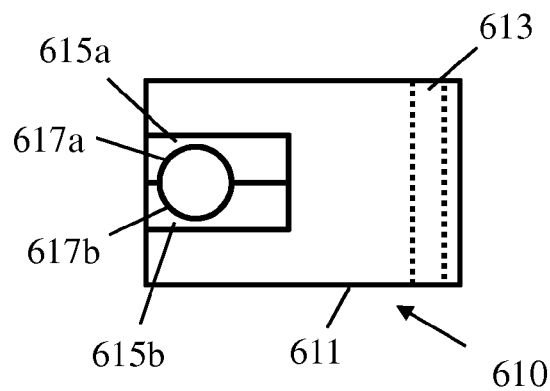

FIG. 15A-15B show side views from the right side, and FIG. 15C-15D show top views, of an unloading station 600 for unloading a blown container 750 from a manufacturing line 100, according to one or more embodiments of the present invention. According to one or more embodiments of the present invention, the unloading station 600 includes an unloading block 610.

The unloading block 610 has main body 611, a first unloading gripper arm 615a with a semi-circular first unloading gripping surface 617a, and a second unloading gripper arm 615b with a semi-circular second unloading gripping surface 617b. The first unloading gripper arm 615a and the second unloading gripper arm 615b are operable to move towards each other, such that the first unloading gripping surface 617a and the second unloading gripping surface 617b clamp around the neck portion 759 of the blown container 750 to grab the blown container 750. The unloading block 610 is operable to move vertically upwards such that the blown container 750 is removed from the projection 151 of the mandrel 150 placed on the mandrel 150. The unloading block 610 is also rotatable about a rotational shaft 613 to move the blown container 750 away from the manufacturing line 100.

An operation of the unloading station 600 according to one or more embodiments of the present invention will now be described with reference to FIGS. 15A-15D. The unloading block 610, which is initially in the open position shown in FIG. 15C, is positioned as shown in FIG. 15A such that the first unloading gripping surface 617a of the first unloading gripper arm 615a and the second unloading gripping surface 617b of the second unloading gripper arm 615b surround two opposing sides of the neck portion 759 of the blown container 750. The first unloading gripper arm 615a and the second unloading gripper arm 615b are then brought together as shown in FIG. 15D, such that the first unloading gripping surface 617a and the second unloading gripping surface 617b clamp the neck portion 759 of the blown container 750. The unloading block 610 is then moved vertically upwards to disengage the projection 151 of the mandrel from the mouth 752 of the blown container 750, and rotated about the rotation axis 613 to the rotated position shown in FIG. 15B.

Once the unloading block 610 is in the position shown in FIG. 15B, the first unloading gripper arm 615a and the second unloading gripper arm 615b are retracted, releasing the blown container 750 from the unloading block 610, thereby unloading the blown container from the manufacturing line 100.

Alternate embodiments of the first and second ovens will now be described with respect to FIGS. 16A-17D.

Figure 16A:
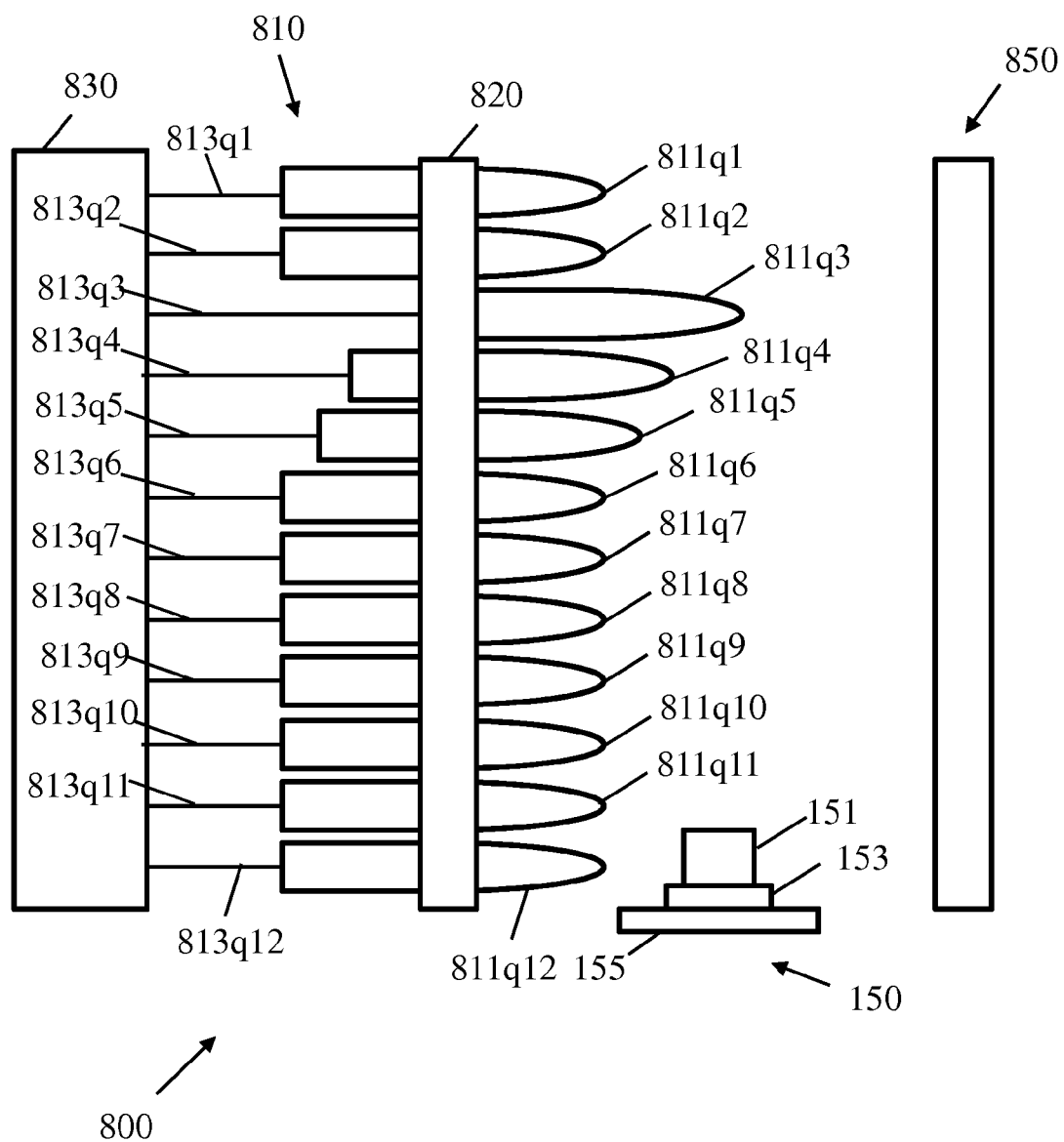
FIG. 16A shows a front view.
Figure 16C:
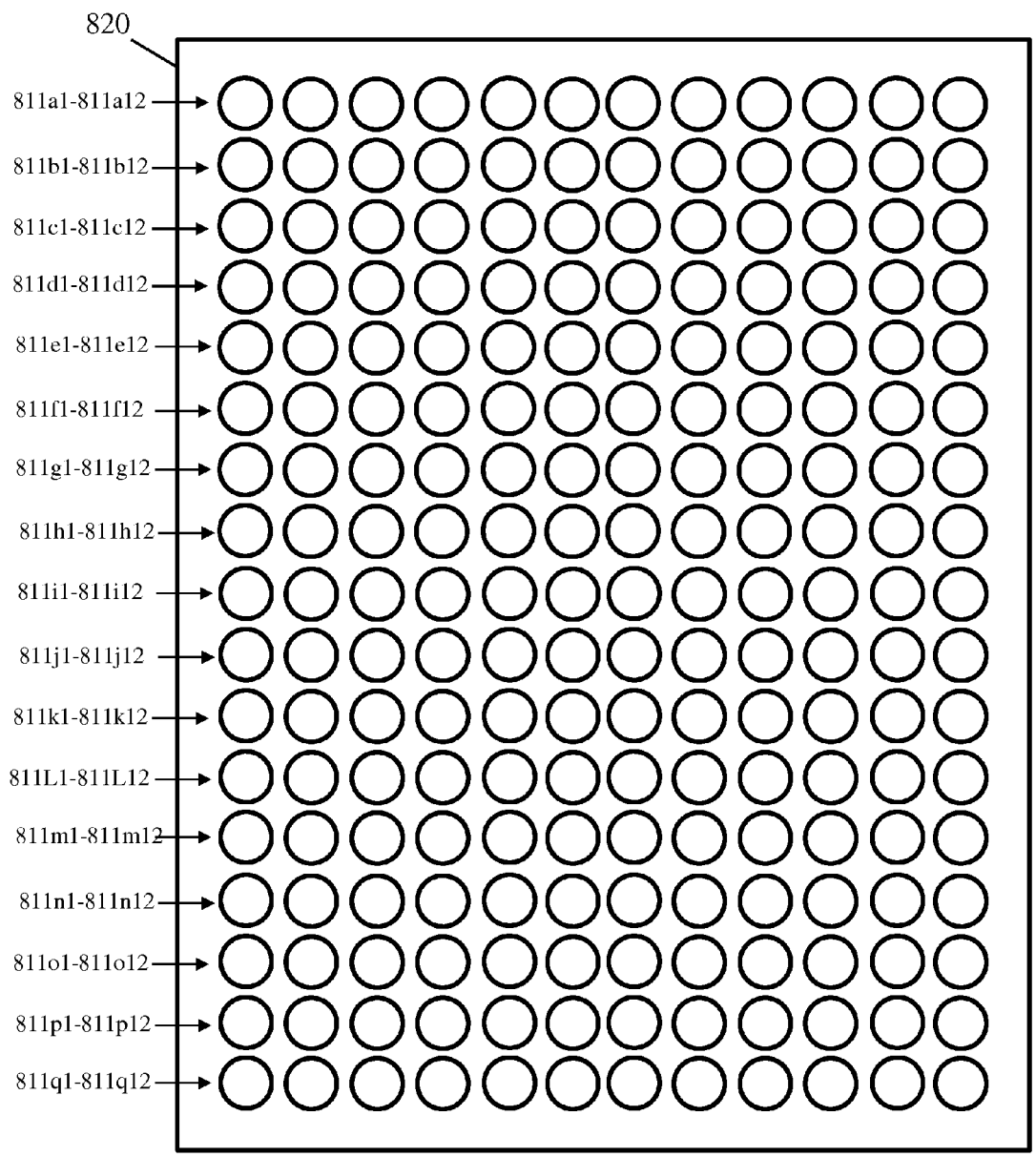
FIG. 16C shows a side view from the right side of a first heating bank according to one or more embodiments of the present invention.
Figure 16D:
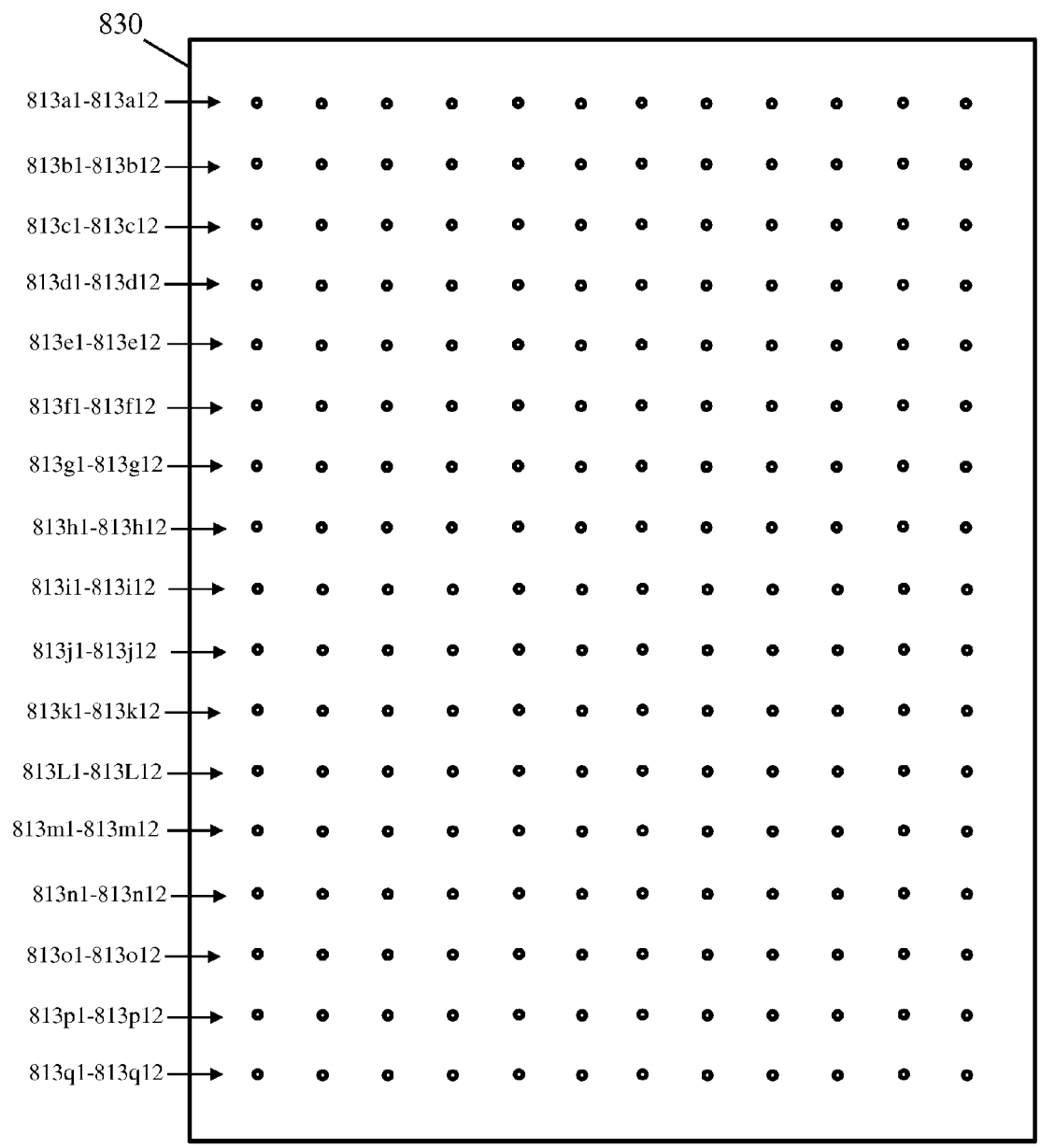
FIG. 16D shows a side view from the right side of first heating bank wiring and a first heating bank controller according to one or more embodiments of the present invention.

FIG. 16A shows a front view, and FIG. 16B shows a top view, of a first oven 800 according to one or more embodiments of the present invention. FIG. 16C shows a side view from the right side of a first heating bank 810 according to one or more embodiments of the present invention. FIG. 16D shows a side view from the right side of first heating bank wiring 813a1-813q12 and a first heating bank controller 830 according to one or more embodiments of the present invention. Although FIGS. 16A and 16B show the mandrel 150 without a preform 710 disposed thereon in the interest of not cluttering the figures, when the mandrel 150 passes through the first oven 800, the mandrel 150 may have a preform 710 disposed thereon, so that the preform 710 undergoes preferential heating while passing through the first oven 800.

The first oven 800 includes a first heating bank 810 and a reflector plate 850. The mandrel 150 and the preform 710 disposed thereon pass through the first oven 800 between the first heating bank 810 and the reflector plate 850. According to one or more embodiments of the present invention, the reflector plate 850 is a rectangular shaped board operable to reflect heat from the first heating bank 810 back towards the preform 710. The reflector plate 850 may have sufficient thickness to contain heat from the first heating bank 810. Although the embodiments shown in the drawings include a first heating bank 810 on one side of the mandrel 150 and the reflector plate 850 on the other side of the mandrel 150, one or more embodiments of the present invention may have heating banks on both sides of the mandrel 150, such that the preform 710 is actively heated from both sides. According to one or more embodiments of the present invention, the reflector plate 850 is cooled.

The first heating bank 810 includes a heating element holder 820 which holds a plurality of heating elements 811a1-811q12. The heating element holder 820 has a plurality of through-holes in which the heating elements 811a1-811q12 are inserted. As shown in FIG. 16C, the heating elements 811a1-811q12 are in a matrix formation within the heating element holder 820. Although the embodiments shown in the drawings have a 12×17 matrix of heating elements for a total of 204 heating elements, the first heating bank 810 may have any number of heating elements. As shown in FIGS. 16A and 16B, the heating elements 811a1-811q12 are individually movable in the left and right side directions. That is, each of the heating elements 811a1-811q12 can be moved towards or away from the reflector plate 850. Thus, the distance between each of the heating elements 811a1-811q12 and the preform 710 can be precisely controlled, which allows for preferential heating of different areas of the preform 710. A first heating bank controller 830 is disposed behind the heating elements 811a1-811q12, and each of the heating elements 811a1-811q12 has first heating bank wiring 813a1-813g12 electrically connecting the heating elements 811a1-811q12 and the first heating bank controller 830. According to one or more embodiments of the present invention, the first heating bank controller 830 both controls and supplies energy to the heating elements 811a1-811q12 through the first heating bank wiring 813a1-813q12. As shown in FIG. 16D, the first heating bank wiring 813a1-813q12 is in a matrix formation corresponding to the matrix formation of the heating elements 811a1-811q12.

In the embodiments shown in FIGS. 16A and 16B, a third row of heating elements 811a3-811q3 is closer to the reflector plate 850 than the other rows, and with the fourth and fifth rows of heating elements 811a4-811q4, 811a5-811q5, the distance between the heating elements and the reflector plate 850 is gradually increased. Thus, the front view profile of the heating elements 811a1-811q12 corresponds to the shape of the preform 710, so that the heating elements 811a1-811q12 surround the preform 710 from the left side to the top. However, the arrangement of the heating elements 811a1-811q12 are not limited to those shown, and the distance between each of the heating elements 811a1-811g12 and the reflector plate 850 can be varied depending on the shape of the preform, as well as the desired preferential heating. Additionally, each of the heating elements 811a1-811q12 can be independently controlled by the first heating bank controller 830, such that the intensity of the heat emitted by each of the heating elements $811a1$-$811q12$ can be individually adjusted as desired for different applications.

An operation of the first oven 800 according to one or more embodiments of the present invention will now be described with reference to FIGS. 16A-16D. The mandrel 150 with the preform 710 disposed thereon is passed through the first oven 800 between the first heating bank 810 and the reflector plate 850 by the conveyor 101 on which the mandrel 150 is disposed. The preform 710 passes through the first oven 800 from the first column of heating elements $811a1$-$811a12$ all the way to the last column of heating elements $811q1$-$811q12$. As the preform 710 passes through the first oven 800, the preform 710 is preferentially heated by the heating elements $811a1$-$811q12$, which are controlled by the first heating bank controller 830.

Figure 17A:
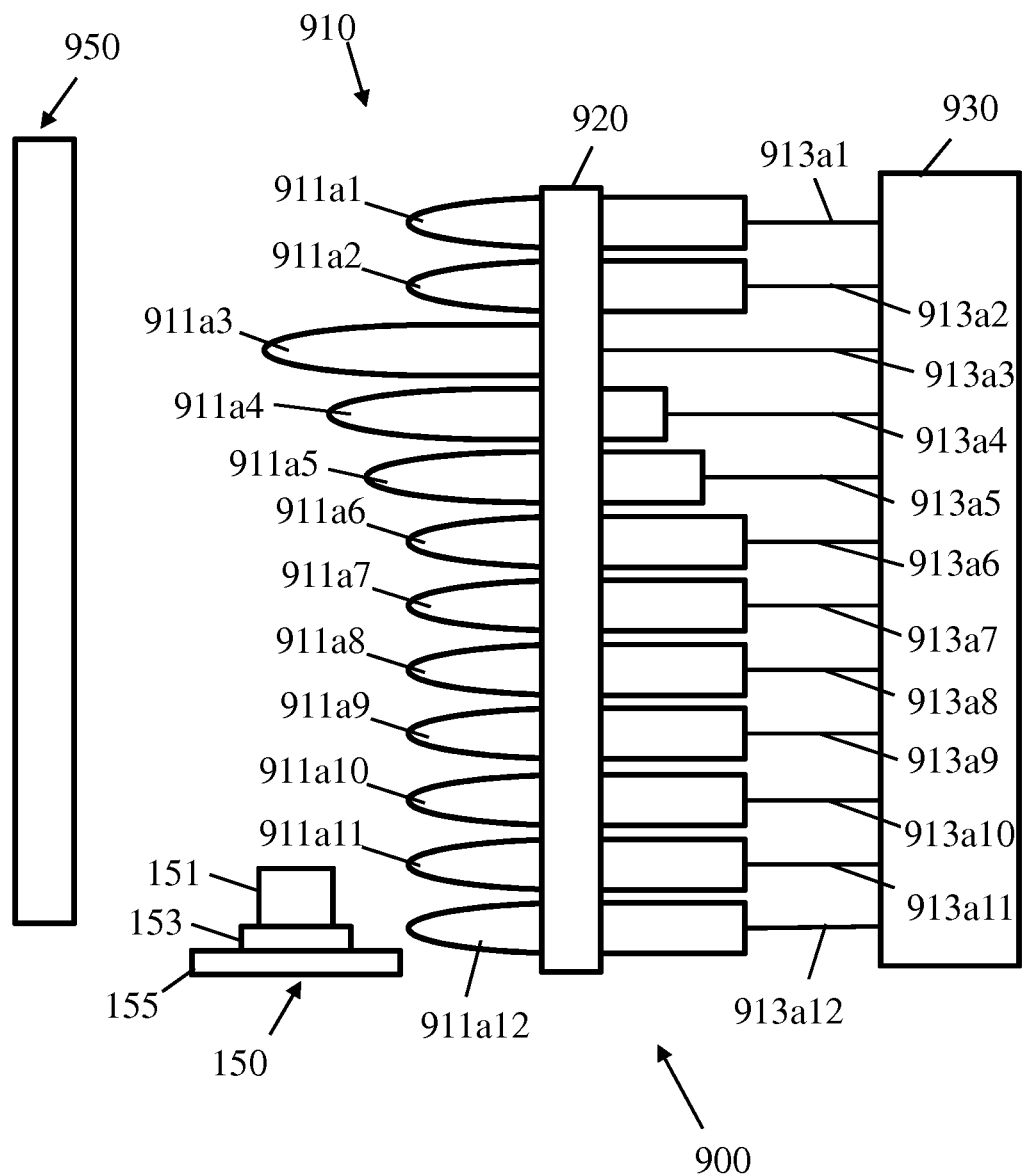
FIG. 17A shows a front view.
Figure 17B:
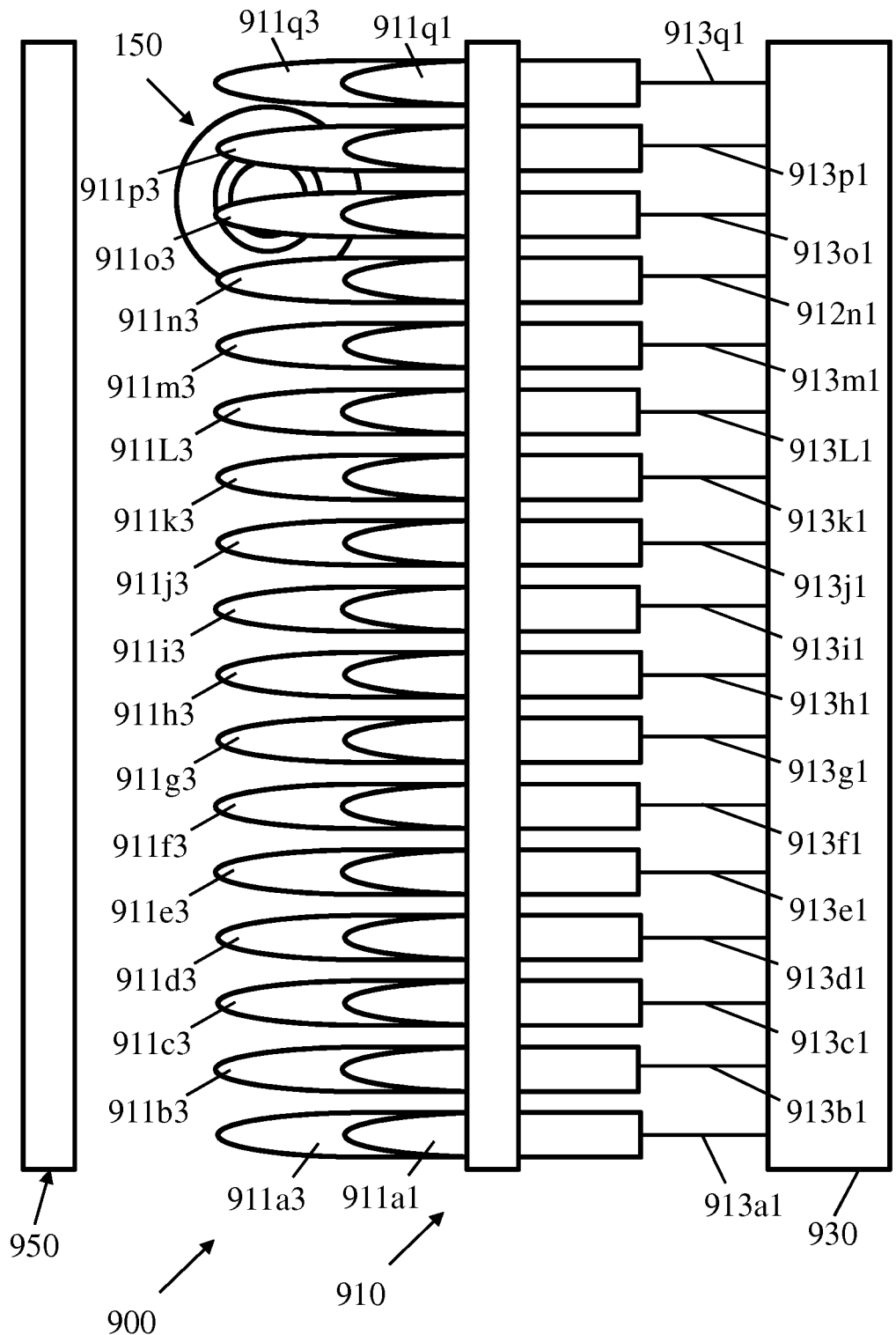
FIG. 17B shows a top view, of a second oven according to one or more embodiments of the present invention.
Figure 17C:
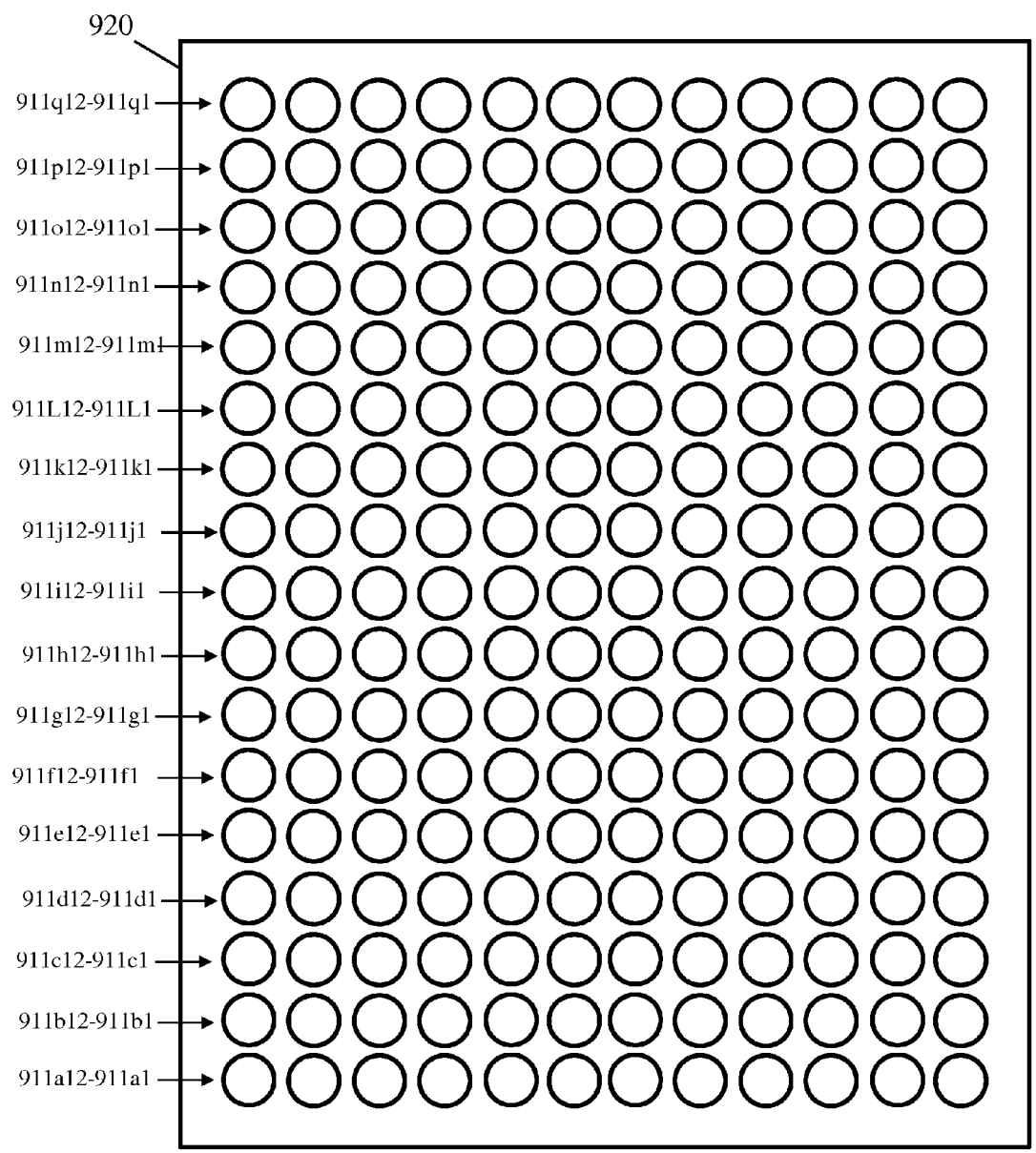
FIG. 17C shows a side view from the left side of a second heating bank according to one or more embodiments of the present invention.
Figure 17D:
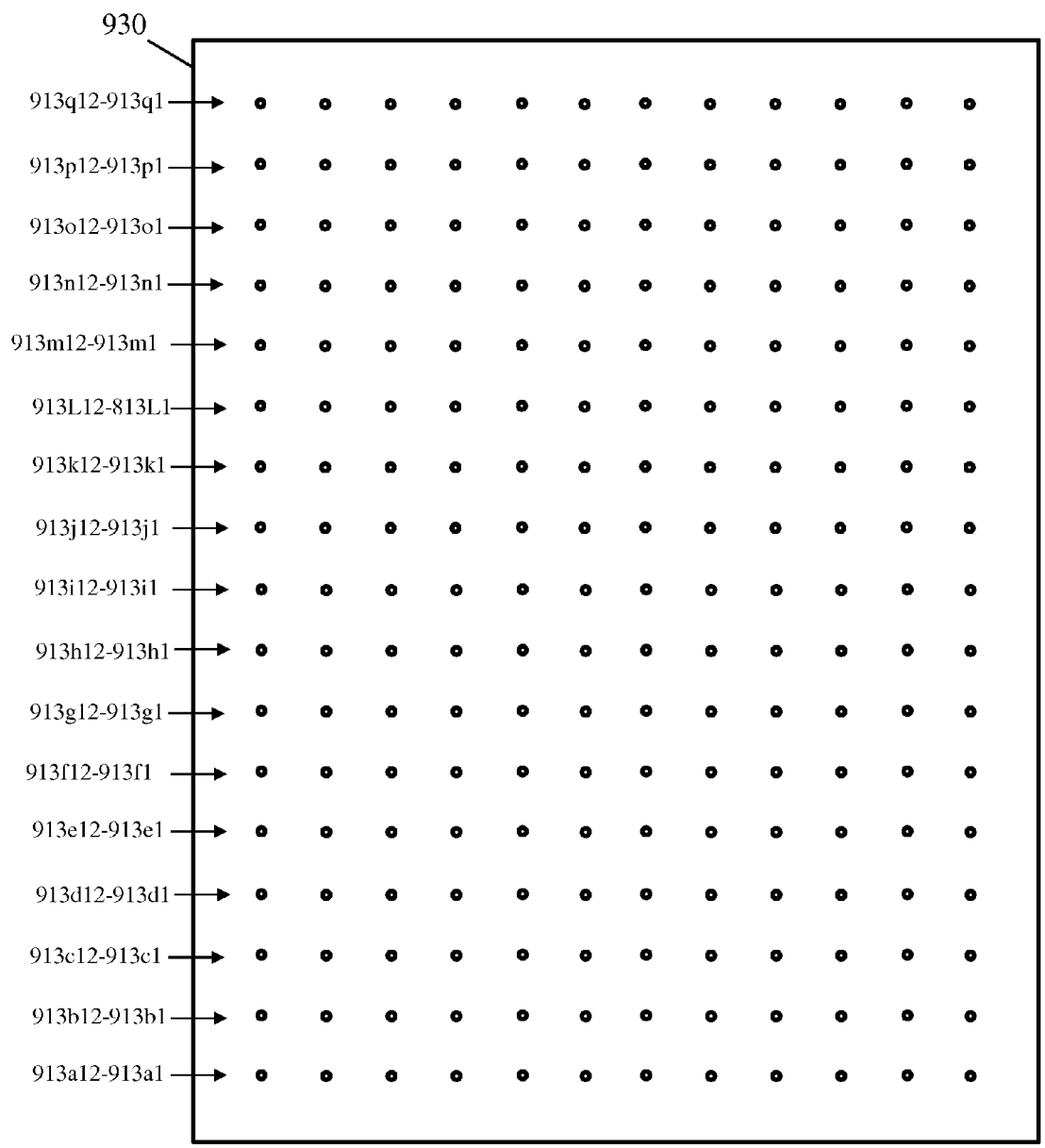
FIG. 17D shows a side view from the left side of second heating bank wiring and a second heating bank controller according to one or more embodiments of the present invention.

FIG. 17A shows a front view, and FIG. 17B shows a top view, of a second oven 900 according to one or more embodiments of the present invention. FIG. 17C shows a side view from the left side of a second heating bank 910 according to one or more embodiments of the present invention. FIG. 17D shows a side view from the left side of second heating bank wiring $913a1$-$913q12$ and second heating bank controller 930 according to one or more embodiments of the present invention. Although FIGS. 17A and 17b show the mandrel 150 without a preform 710 disposed thereon in the interest of not cluttering the figures, when the mandrel 150 passes through the second oven 900, the mandrel 150 may have a preform 710 disposed thereon, so that the preform 710 undergoes preferential heating while passing through the second oven 900.

The second oven 900 includes a second heating bank 910 and a reflector plate 950. The mandrel 150 and the preform 710 disposed thereon pass through the second oven 900 between the second heating bank 910 and the reflector plate 950. According to one or more embodiments of the present invention, the reflector plate 950 is a rectangular shaped board operable to reflect heat from the second heating bank 910 back towards the preform 710. The reflector plate 950 may have sufficient thickness to contain heat from the second heating bank 910. Although the embodiments shown in the drawings include a second heating bank 910 on one side of the mandrel 150 and the reflector plate 950 on the other side of the mandrel 150, one or more embodiments of the present invention may have heating banks on both sides of the mandrel 150, such that the preform 710 is actively heated from both sides. According to one or more embodiments of the present invention, the reflector plate 950 is cooled.

The second heating bank 910 includes a heating element holder 920 which holds a plurality of heating elements $911a1$-$911q12$. The heating element holder 920 has a plurality of through-holes in which the heating elements $911a1$-$911q12$ are inserted. As shown in FIG. 17C, the heating elements $911a1$-$911q12$ are in a matrix formation within the heating element holder 920. Although the embodiments shown in the drawings have a 12×17 matrix of heating elements for a total of 204 heating elements, the second heating bank 910 may have any number of heating elements. As shown in FIGS. 17A and 17B, the heating elements $911a1$-$911q12$ are individually movable in the left and right side directions. That is, each of the heating elements $911a1$-$911q12$ can be moved towards or away from the reflector plate 950. Thus, the distance between each of the heating elements $911a1$-$911q12$ and the preform 710 can be precisely controlled, which allows for preferential heating of different areas of the preform 710. A second heating bank controller 930 is disposed behind the heating elements $911a1$-$911q12$, and each of the heating elements $911a1$-$911q12$ has second heating bank wiring $913a1$-$913q12$ electrically connecting the heating elements $911a1$-$911q12$ and the second heating bank controller 930. According to one or more embodiments of the present invention, the second heating bank controller 930 both controls and supplies energy to the heating elements $911a1$-$911q12$ through the second heating bank wiring $913a1$-$913g12$. As shown in FIG. 17D, the second heating bank wiring $913a1$-$913q12$ is in a matrix formation corresponding to the matrix formation of the heating elements $911a1$-$911q12$.

In the embodiments shown in FIGS. 17A and 17B, a third row of heating elements $911a3$-$911q3$ is closer to the reflector plate 950 than the other rows, and with the fourth and fifth rows of heating elements $911a4$-$911q4$, $911a5$-$911q5$, the distance between the heating elements and the reflector plate 950 is gradually increased. Thus, the front view profile of the heating elements $911a1$-$911q12$ corresponds to the shape of the preform 710, and surrounds the preform 710 from the right side to the top. However, the arrangement of the heating elements $911a1$-$911q12$ are not limited to those shown, and the distance between each of the heating elements $911a1$-$911q12$ and the reflector plate 950 can be varied depending on the shape of the preform, as well as the desired preferential heating. Additionally, each of the heating elements $911a1$-$911q12$ can be independently controlled by the second heating bank controller 930, such that the intensity of the heat emitted by each of the heating elements $911a1$-$911q12$ can be individually adjusted as desired for different applications.

An operation of the second oven 900 according to one or more embodiments of the present invention will now be described with reference to FIGS. 17A-17D. After the calibration station 130, the mandrel 150 with the preform 710 disposed thereon is passed through the second oven 900 between the second heating bank 910 and the reflector plate 950 by the conveyor 101 on which the mandrel 150 is disposed. The preform 710 passes through the second oven 900 from the first column of heating elements $911a1$-$911a12$ all the way to the last column of heating elements $911q1$-$911q12$. As the preform 710 passes the second oven 900, the preform 710 is preferentially heated by the heating elements $911a1$-$911q12$, which are controlled by the second heating bank controller 930.

Figure 18:
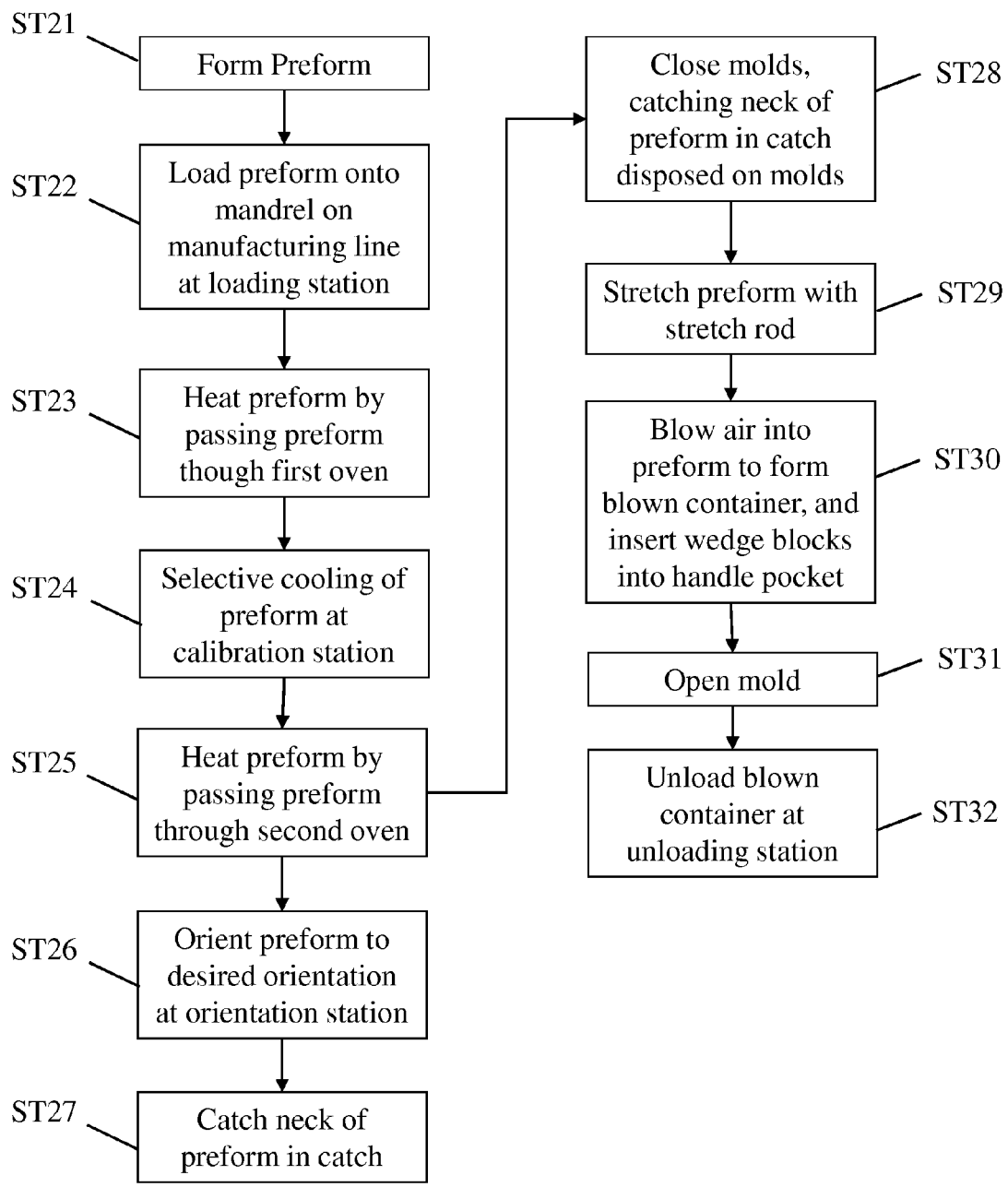
FIG. 18 is a flow chart showing a manufacturing method for forming a container with an integral handle from a preform, according to one or more embodiments of the present invention.

FIG. 18 is a flow chart showing a manufacturing method for forming a container 750 with an integral handle 770 from a preform 710, according to one or more embodiments of the present invention.

The first step ST21 through the seventh step ST27 of the manufacturing method shown in FIG. 18 are similar to the first step ST1 through the seventh step ST7 shown in FIG. 5 and, therefore, description thereof is omitted.

In an eight step ST28, the first and second molds 510, 520 are brought together to a closed position, securing the neck portion 719 of the preform 710 between first and second mold catches 530, 540 of the first and second molds 510, 520. According to one or more embodiments of the present invention, the first and second mold catches 530, 540 may be omitted from the first and second molds 510, 520, and the catch 160, 170 may keep the preform 710 secured while the first and second molds 510, 520 are brought together to the closed position. Alternatively, according to one or more embodiments of the present invention, the seventh step ST27 may be omitted, and the first and second mold catches 530, 540 of the first and second molds 510, 520, may keeps the preform 710 secured without employing the catch 160, 170.

In a ninth step ST29, while the neck portion 719 is secured by the catch 160, 170 and/or the first and second mold catches 530, 540, a stretch rod 180 stretches the preform 710 to form a stretched preform 730.

In a tenth step ST30, concurrently, a wedge block or multiple wedge blocks are inserted into the handle pocket 745 to move and/or stretch the handle 740, and air is blown into the stretched preform 730, to form the blown container 750.

Once the blowing process and the of the tenth step ST30 is completed, in an eleventh step ST31, the first and second molds 510, 520 are moved apart to an open position. The conveyor 101 is then rotated by the actuating wheels 110, 120 such that the mandrel 150 and the blown container 750 are moved to an unloading station 600.

In a twelfth step ST32, the blown container 750 is unloaded from the unloading station 600.

Figure 19A:
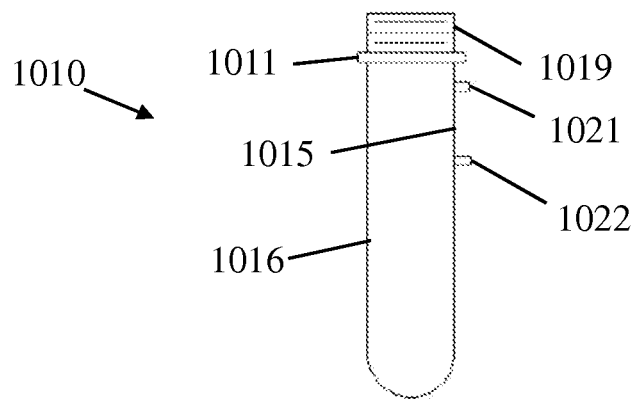
FIG. 19A is a side view of an example of a preform for use in a manufacturing method and device according to one or more embodiments of the present invention, wherein, instead of the handle being integral with the container, two handle attachment notches are disposed on the preform.

FIG. 19A is a side view of an example of a preform for use in a manufacturing method and device according to one or more embodiments of the present invention, wherein, instead of the handle being integral with the preform, first and second handle attachment notches 1021, 1022 are disposed on the preform 1010.

The preform 1010 shown in FIG. 19A is similar to the preform 710 shown in FIG. 1 and, therefore, description of many of the elements of the preform 1010 similar to the preform 710 is omitted.

The preform 1010 has a threaded neck portion 1019, a thread stop 1011, and a preform main body 1016. The preform 1010 of FIG. 19A has a first handle attachment notch 1021 and a second handle attachment notch 1022, with an opposing surface 1015 therebetween. As with the above embodiments, a stretch rod 180 stretches the preform 1010, such that the second handle attachment notch 1022 moves away from the first handle attachment notch 1021, and when the stretched preform is blown at the mold station 500, the second handle attachment notch 1022 moves to the position shown in FIG. 19B.

Figure 19B:
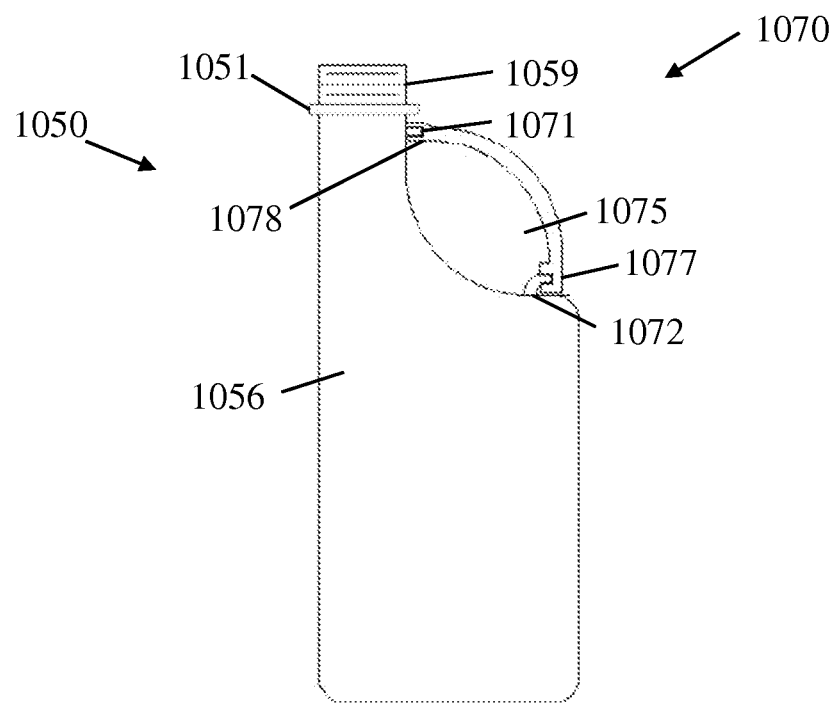
FIG. 19B is a side view of an example of a container formed by a manufacturing method and device according to one or more embodiments of the present invention, wherein, instead of the handle being integral with the container, the handle is attached to two handle attachment notches disposed on the container.

FIG. 19B is a side view of an example of a container 1050 formed by a manufacturing method and device according to one or more embodiments of the present invention, wherein, instead of the handle 1070 being integral with the container 1050, the handle 1070 is attached to the first and second handle attachment notches 1021, 1022 disposed on the container 1050.

The formed container 1050 shown in FIG. 19B is similar to the blown container 750 shown in FIG. 3 and, therefore, description of many of the elements of the blown container 1050 similar to the blown container 750 is omitted.

The blown container 1050 has a threaded neck portion 1059, a thread stop 1051, and a blown container main body 1056. Instead of the handle being integral with the blown container 750 as in FIG. 3, a handle 1070 is attached to the blown container 1050 of FIG. 19B after the container is blown. That is, an upper end 1078 of the handle 1070 is attached to a first handle attachment notch 1071, and a lower end 1077 of the handle 1070 is attached to a second handle attachment notch 1072. Thus, a handle pocket 1075 is formed between an opposing surface 1015 of the blown container 1050 and the attached handle 1070. Therefore, with the preform 1010 and the blown container 1050 shown in FIGS. 19A and 19B, a handle pocket wedge block may be unnecessary for forming the handle 1070.

Figure 20A:
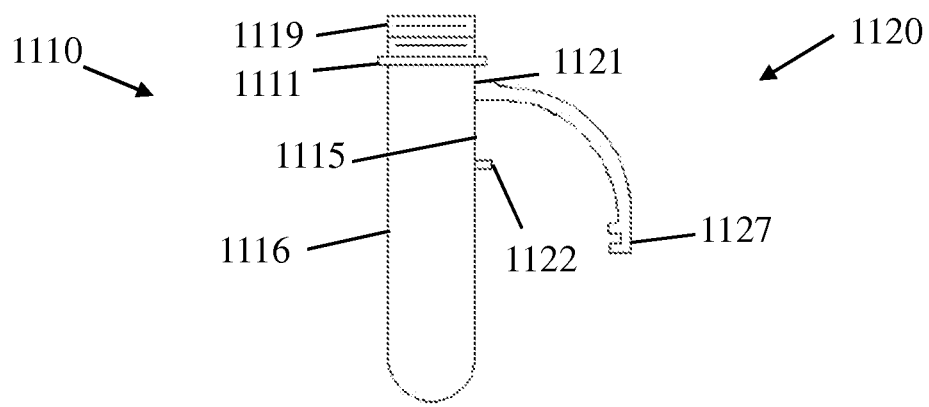
FIG. 20A is a side view of an example of a preform for use in a manufacturing method and device according to one or more embodiments of the present invention, wherein a top end of the handle is integral with the container, a bottom end of the handle has an attachment portion, and a handle attachment notch is disposed on the preform.

FIG. 20A is a side view of an example of a preform for use in a manufacturing method and device according to one or more embodiments of the present invention, wherein a top end of the handle is integral with the container, a bottom end of the handle has an attachment portion, and a handle attachment notch is disposed on the preform.

The preform 1110 shown in FIG. 20A is similar to the preform 710 shown in FIG. 1 and, therefore, description of many of the elements of the preform 1110 similar to the preform 710 is omitted.

The preform 1110 has a threaded neck portion 1119, a thread stop 1111, and a preform main body 1116. The preform 1110 of FIG. 20A has an integral handle 1120 having a free lower end 1127, while the upper end is disposed on the main body 1116 at a handle attachment point 1121. A handle attachment notch 1122 is formed on the main body 1116, with an opposing surface 1115 between the handle attachment point 1121 and the handle attachment notch 1122. As with the above embodiments, a stretch rod 180 stretches the preform 1110, such that the handle attachment notch 1122 moves away from the handle attachment point 1121, and when the stretched preform is blown at the mold station 500, the handle attachment notch 1122 moves to the position shown in FIG. 20B.

Figure 20B:
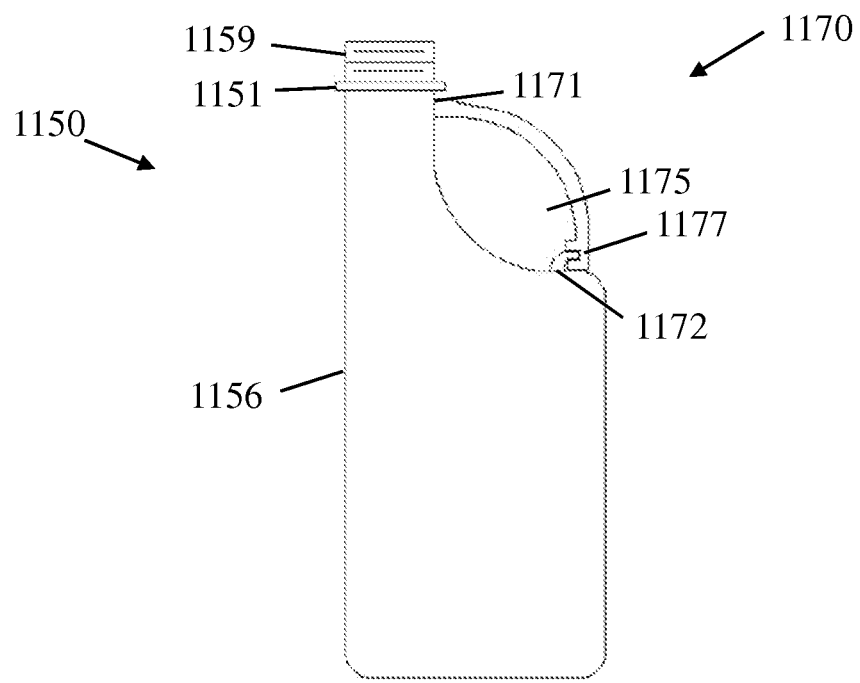
FIG. 20B is a side view of an example of a container with an integral handle formed by a manufacturing method and device according to one or more embodiments of the present invention, wherein a top end of the handle is integral with the container, and an attachment portion formed on a bottom end of the handle engages with a handle attachment notch disposed on the preform.

FIG. 20B is a side view of an example of a blown container 1170 with an integral handle 1170 formed by a manufacturing method and device according to one or more embodiments of the present invention, wherein a top end of the handle 1170 is integral with the container 1150, and an attachment portion formed on a bottom end 1177 of the handle engages with a handle attachment notch 1172 disposed on the preform 1110.

The formed container 1150 shown in FIG. 20B is similar to the blown container 750 shown in FIG. 3 and, therefore, description of many of the elements of the blown container 1150 similar to the blown container 750 is omitted.

The blown container 1150 has a threaded neck portion 1159, a thread stop 1151, and a blown container main body 1156. The handle 1170 is integrally formed on the main body 1156, having an upper end of the handle 1170 disposed on the main body 1156 at a handle attachment point 1171. An attachment portion formed on a free lower end 1177 of the handle 1170 is attached to a handle attachment notch 1172. Thus, a handle pocket 1175 is formed between an opposing surface 1115 of the blown container 1150 and the handle 1070. Therefore, with the preform 1110 and the blown container 1150 shown in FIGS. 20A and 20B, a handle pocket wedge block may be unnecessary for forming the handle 1170.

Above, a calibration station 130 is provided for selectively cooling the integral handle 720 of the preform 710 to avoid crystallization. Alternatively or additionally, the temperature of the integral handle 720 may be reduced by mechanically moving the integral handle 720 away from the heating elements of the first and/or second ovens. This could be done, for example, by slightly bending the straight handle portion 724 inwards. Alternatively or additionally, the temperature of the integral handle 720 may be reduced by disposing an insulation mask on the integral handle 720. According to one or more embodiments of the present invention, the insulation mask may be removable and/or disposable. For example, the insulation mask may be able to burn up from the heating elements.

According to one or more embodiments of the present invention, the mandrel 150 or the projection 151 of the mandrel may be rotatable, such that the orientation of the preform 710 can be controlled throughout the manufacturing line 100.

According to one or more embodiments of the present invention, the air for blowing the stretched preform 730 is provided through the hole in the projection 151 of the mandrel 150. The air may be blown around the stretch rod 180, 185 or, alternatively, the stretch rod 180, 185 may be completely retracted before the air is blown through the hole in the projection 151.

According to one or more embodiments of the present invention, the preform 710 may be stretched to form the stretched preform 730 by processes other than the stretch rod. For example, an air blowing process or a vacuum process may be employed to stretch the preform 710.

According to one or more embodiments of the present invention, instead of the upper and lower handle pocket wedge blocks 570, 580 described above, a rotational cam may be employed for stretching the integral handle 740.

According to one or more embodiments of the present invention, instead of the upper and lower handle pocket wedge blocks 570, 580 being disposed on or formed integrally with the first and second molds 510, 520, the upper and lower handle pocket wedge blocks 570, 580 or a single handle pocket wedge block may be independent of the first and second molds 510, 520, and inserted into the first and second molds 510, 520 through insertion apertures formed in the first and second molds 510, 520.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A method for forming a container with an integral handle, comprising:
    heating a preform having an integral handle in a first oven;
    stretching the preform;
    closing a first mold having a first mold recess and a second mold having a second mold recess around the preform; and
    blowing air into the preform;
    wherein a handle pocket wedge block is inserted into a handle pocket of the integral handle of the preform within the first mold and the second mold such that the handle pocket wedge block pushes on the integral handle to change a shape thereof.

2. A method for forming a container with an integral handle, comprising:
    heating a preform having an integral handle in a first oven;
    stretching the preform;
    closing a first mold having a first mold recess and a second mold having a second mold recess around the preform; and
    blowing air into the preform;
    wherein a handle pocket wedge block is inserted into a handle pocket of the integral handle of the preform within the first mold and the second mold, and
    wherein the method further comprises uncoiling a U-shaped portion of the integral handle of the preform while stretching the preform.

3. The method of claim 1,
    wherein the stretching the preform is performed with a stretch rod inserted into the preform.

4. A method for forming a container with an integral handle, comprising:
    heating a preform having an integral handle in a first oven;
    stretching the preform;
    closing a first mold having a first mold recess and a second mold having a second mold recess around the preform; and
    blowing air into the preform;
    wherein a handle pocket wedge block is inserted into a handle pocket of the integral handle of the preform within the first mold and the second mold,
    wherein the stretching the preform is performed with a multi-stage stretch rod inserted into the preform, and
    wherein the multi-stage stretch rod comprises a first stage stretch rod body that extends a first distance, and a second stage stretch rod body having a diameter smaller than the first stage stretch rod body that extends from an end of the first stretch rod body.

5. A method for forming a container with an integral handle, comprising:
    heating a preform having an integral handle in a first oven;
    stretching the preform;
    closing a first mold having a first mold recess and a second mold having a second mold recess around the preform; and
    blowing air into the preform;
    wherein a handle pocket wedge block is inserted into a handle pocket of the integral handle of the preform within the first mold and the second mold, and
    wherein the handle pocket wedge block comprises a tapered cam surface that moves the integral handle as the handle pocket wedge block is inserted into the handle pocket of the integral handle.

6. A method for forming a container with an integral handle, comprising:
    heating a preform having an integral handle in a first oven;
    stretching the preform;
    closing a first mold having a first mold recess and a second mold having a second mold recess around the preform; and
    blowing air into the preform;
    wherein a handle pocket wedge block is inserted into a handle pocket of the integral handle of the preform within the first mold and the second mold,
    wherein the handle pocket wedge block comprises a first handle pocket wedge block disposed on the first mold, and a second handle pocket wedge block disposed on a second mold,
    wherein the first handle pocket wedge block is inserted into an upper portion of the handle pocket of the integral handle in a first direction, and
    wherein the second handle pocket wedge block is inserted into a lower portion of the handle pocket of the integral handle in a second direction opposite the first direction.

7. The method of claim 6,
    wherein the first handle pocket wedge block comprises a first tapered cam surface that moves the integral handle as the first handle pocket wedge block is inserted into the upper portion of the handle pocket of the integral handle, and
    wherein the second handle pocket wedge block comprises a second tapered cam surface that moves the integral handle as the second handle pocket wedge block is inserted into the lower portion of the handle pocket of the integral handle.

8. A method for forming a container with an integral handle, comprising:
    heating a preform having an integral handle in a first oven;
    stretching the preform;

closing a first mold having a first mold recess and a second mold having a second mold recess around the preform; and blowing air into the preform;

wherein a handle pocket wedge block is inserted into a handle pocket of the integral handle of the preform within the first mold and the second mold, and wherein the method further comprises:
cooling at least a portion of the integral handle by blowing air on the integral handle after the preform is heated in the first oven; and
heating the preform in a second oven.

9. A method for forming a container with an integral handle, comprising:

heating a preform having an integral handle in a first oven; stretching the preform;

closing a first mold having a first mold recess and a second mold having a second mold recess around the preform; and blowing air into the preform;

wherein a handle pocket wedge block is inserted into a handle pocket of the integral handle of the preform within the first mold and the second mold, and wherein the method further comprises adjusting orientation of the preform before closing the first mold and the second mold around the preform.

10. The method of claim 1, further comprising:
catching a neck portion of the preform in a catch before stretching the preform.

11. A method for forming a container with an integral handle, comprising:

heating a preform having an integral handle in a first oven; stretching the preform;

closing a first mold having a first mold recess and a second mold having a second mold recess around the preform; and blowing air into the preform;

wherein a handle pocket wedge block is inserted into a handle pocket of the integral handle of the preform within the first mold and the second mold, wherein the method further comprises catching a neck portion of the preform in a catch before stretching the preform, wherein the catch comprises a first turnstile and a second turnstile comprising a plurality of semicircular catching surfaces, and wherein the neck portion of the preform is secured between opposing semi-circular catching surfaces of the first and second turnstiles.

12. A method for forming a container with an integral handle, comprising:

heating a preform having an integral handle in a first oven; stretching the preform;

closing a first mold having a first mold recess and a second mold having a second mold recess around the preform; and blowing air into the preform;

wherein a handle pocket wedge block is inserted into a handle pocket of the integral handle of the preform within the first mold and the second mold, and wherein the method further comprises catching a neck portion of the preform in a catch before stretching the preform, wherein the catch comprises a spring-loaded first catch body having a first catching surface, and a spring-loaded second catch body having a second catching surface, and wherein the neck portion of the preform is secured between the first catching surface and the second catching surface.

13. A method for forming a container with an integral handle, comprising:

heating a preform having an integral handle in a first oven; stretching the preform;

closing a first mold having a first mold recess and a second mold having a second mold recess around the preform; and blowing air into the preform;

wherein a handle pocket wedge block is inserted into a handle pocket of the integral handle of the preform within the first mold and the second mold, wherein the method further comprises loading the preform onto a mandrel disposed on a conveyor, wherein one of the preform and the mandrel comprises a notch, and the other of the preform and the mandrel comprises a recess, and wherein the notch engages with the recess to secure an orientation of the preform with respect to the mandrel.

14. The method of claim 1, further comprising:
catching a neck of the preform between a first mold catch disposed on the first mold and a second mold catch disposed on the second mold.

15. A method for forming a container with an integral handle, comprising:

heating a preform having an integral handle in a first oven; stretching the preform;

closing a first mold having a first mold recess and a second mold having a second mold recess around the preform; and blowing air into the preform;

wherein a handle pocket wedge block is inserted into a handle pocket of the integral handle of the preform within the first mold and the second mold, and wherein the method further comprises disposing an insulation mask on the integral handle of the preform.

16. A method for forming a container with an integral handle, comprising:

heating a preform having an integral handle in a first oven; stretching the preform;

closing a first mold having a first mold recess and a second mold having a second mold recess around the preform; and blowing air into the preform;

wherein a handle pocket wedge block is inserted into a handle pocket of the integral handle of the preform within the first mold and the second mold, wherein the first oven comprises a first heating bank comprising a plurality of heating elements, and wherein each of the plurality of heating elements are individually movable in a direction perpendicular to a direction in which the preform passes through the first oven.

17. The method of claim 1,
wherein the first oven comprises a first heating bank comprising a plurality of heating elements, and
wherein a heat output of each of the plurality of heating elements are individually controlled by a first heating bank controller.

18. The method of claim 8,
wherein the second oven comprises a second heating bank comprising a plurality of heating elements, and wherein each of the plurality of heating elements are individually movable in a direction perpendicular to a direction in which the preform passes through the second oven.

19. The method of claim 8, wherein the second oven comprises second heating bank comprising a plurality of heating elements, and wherein a heat output of each of the plurality of heating elements are individually controlled by a second heating bank controller.

* * * * *